US012590200B2

(12) United States Patent
Silvi

(10) Patent No.: US 12,590,200 B2
(45) Date of Patent: Mar. 31, 2026

(54) POLYESTER COMPOSITIONS INCLUDING CARBON NANOTUBES AS MICROWAVE ABSORBERS IN SENSOR APPLICATIONS

(71) Applicant: SHPP GLOBAL TECHNOLOGIES B.V., Bergen op Zoom (NL)

(72) Inventor: Norberto Silvi, Selkirk, NY (US)

(73) Assignee: SHPP Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 18/576,778

(22) PCT Filed: Jul. 7, 2022

(86) PCT No.: PCT/IB2022/056288
§ 371 (c)(1),
(2) Date: Jan. 5, 2024

(87) PCT Pub. No.: WO2023/281440
PCT Pub. Date: Jan. 12, 2023

(65) Prior Publication Data
US 2025/0066578 A1      Feb. 27, 2025

(30) Foreign Application Priority Data
Jul. 8, 2021      (EP) ..................................... 21184608

(51) Int. Cl.
*C08K 3/04*      (2006.01)
*C08L 67/02*      (2006.01)
*H01Q 1/52*      (2006.01)
(52) U.S. Cl.
CPC .............. *C08K 3/041* (2017.05); *C08L 67/02* (2013.01); *H01Q 1/526* (2013.01);
(Continued)

(58) Field of Classification Search
CPC ....................................................... C08K 3/041
See application file for complete search history.

(56) References Cited

U.S. PATENT DOCUMENTS

| | | | | |
|---|---|---|---|---|
| 2010/0143714 | A1* | 6/2010 | Chang | C08K 3/041 |
| | | | | 977/932 |
| 2023/0340252 | A1* | 10/2023 | Iseki | C08L 67/02 |

FOREIGN PATENT DOCUMENTS

| | | |
|---|---|---|
| EP | 3845587 A1 | 7/2021 |
| EP | 3943535 A1 | 1/2022 |

(Continued)

OTHER PUBLICATIONS

Nanocyl, NC7000 Technical Data Sheet, V08, Jul. 12, 2016 (4 pgs.).
(Continued)

*Primary Examiner* — William D Young
(74) *Attorney, Agent, or Firm* — Quicker Law, LLC

(57) ABSTRACT

Thermoplastic compositions include: a thermoplastic polymer component including a polyester; and from greater than 0.10 wt % to about 1.95 wt % of a carbon nanotube (CNT) fdler. A 6 in×8 in×⅛ in molded sample of the composition has a percent Absorbed Power measured in Transmission mode of at least 60% when observed at a 77 GHz frequency according to a Free Space method. In some aspects the polyester includes polybutylene terephthalate (PBT). Further aspects include articles (e.g., a radar sensor, a camera, an electronic control unit, etc.) including a molded part including a microwave absorbing material (absorber). The article may have at least two openings to allow the transmission of microwave radiation between a transmitting antenna and a receiving antenna located in/on the printed circuit board of the sensor.

15 Claims, 21 Drawing Sheets

(52) U.S. Cl.
CPC .. *C08K 2201/001* (2013.01); *C08K 2201/003* (2013.01); *C08K 2201/006* (2013.01); *C08L 2203/20* (2013.01); *C08L 2205/025* (2013.01); *C08L 2205/035* (2013.01)

(56) References Cited

FOREIGN PATENT DOCUMENTS

| | | | |
|---|---|---|---|
| JP | 2003-100147 | A | 4/2003 |
| JP | 2016-504471 | A | 2/2016 |
| JP | 2016-108524 | A | 6/2016 |
| JP | 6707859 | B2 | 6/2020 |
| JP | 2022-008176 | A | 1/2022 |
| KR | 10-2136601 | B1 | 7/2020 |
| WO | 2015/014897 | A1 | 2/2015 |
| WO | 2021/256488 | A1 | 12/2021 |

OTHER PUBLICATIONS

Seng, L. et al. "EMI shielding based on MWCNTs/polyester composites", Applied Physics A, vol. 124 No. 140, Jan. 15, 2018 (7 pgs.).

Yin, H. et al. "Carbon-based nanofillers/Poly(butylene terephthalate): thermal, dielectric, electrical and rheological properties", Journal of Polymer Research, vol. 22 No. 140, Jun. 23, 2015 (13 pgs.).

International Search Report and Written Opinion mailed Sep. 15, 2022 in PCT/IB2022/056288 (13 pgs.).

* cited by examiner

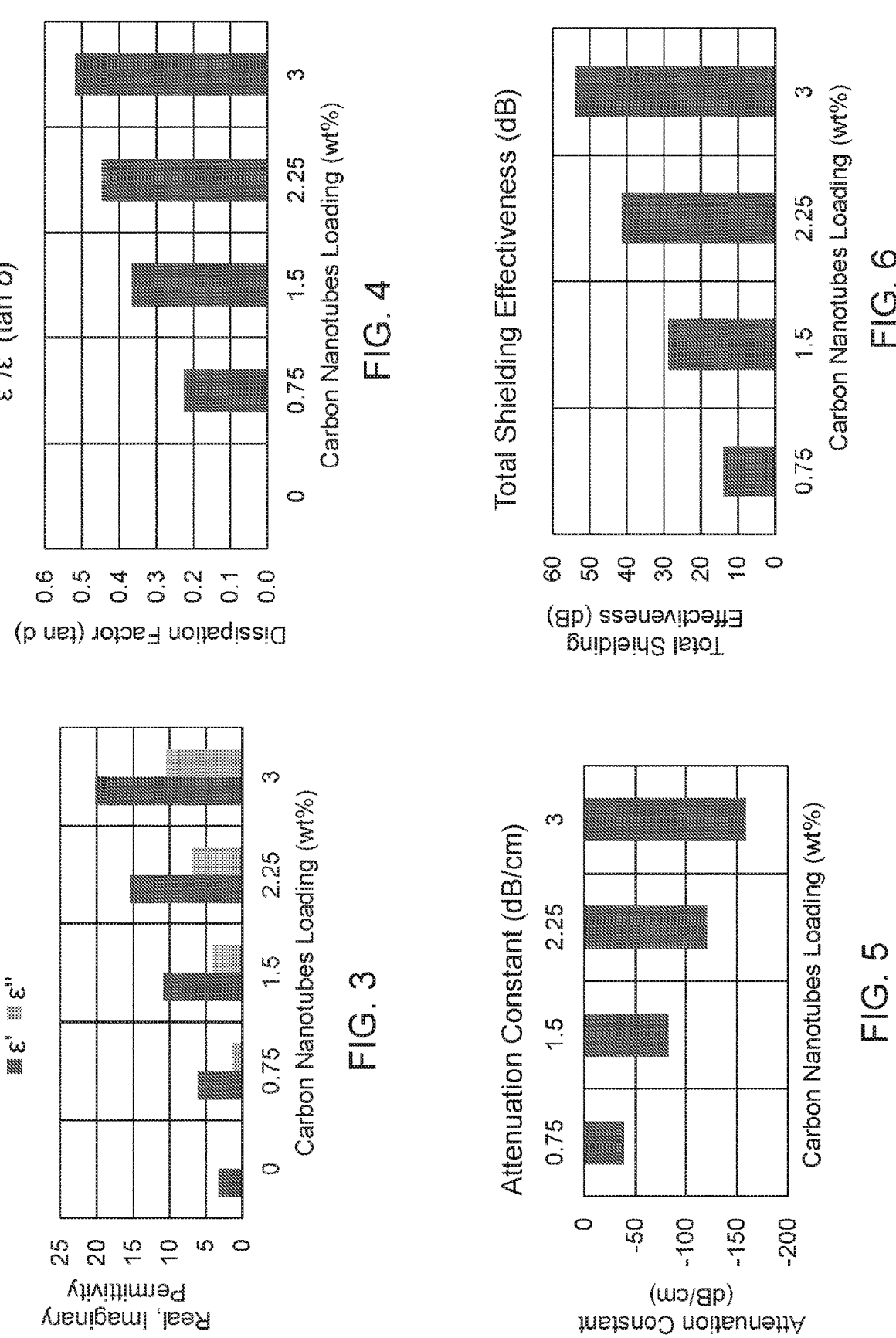

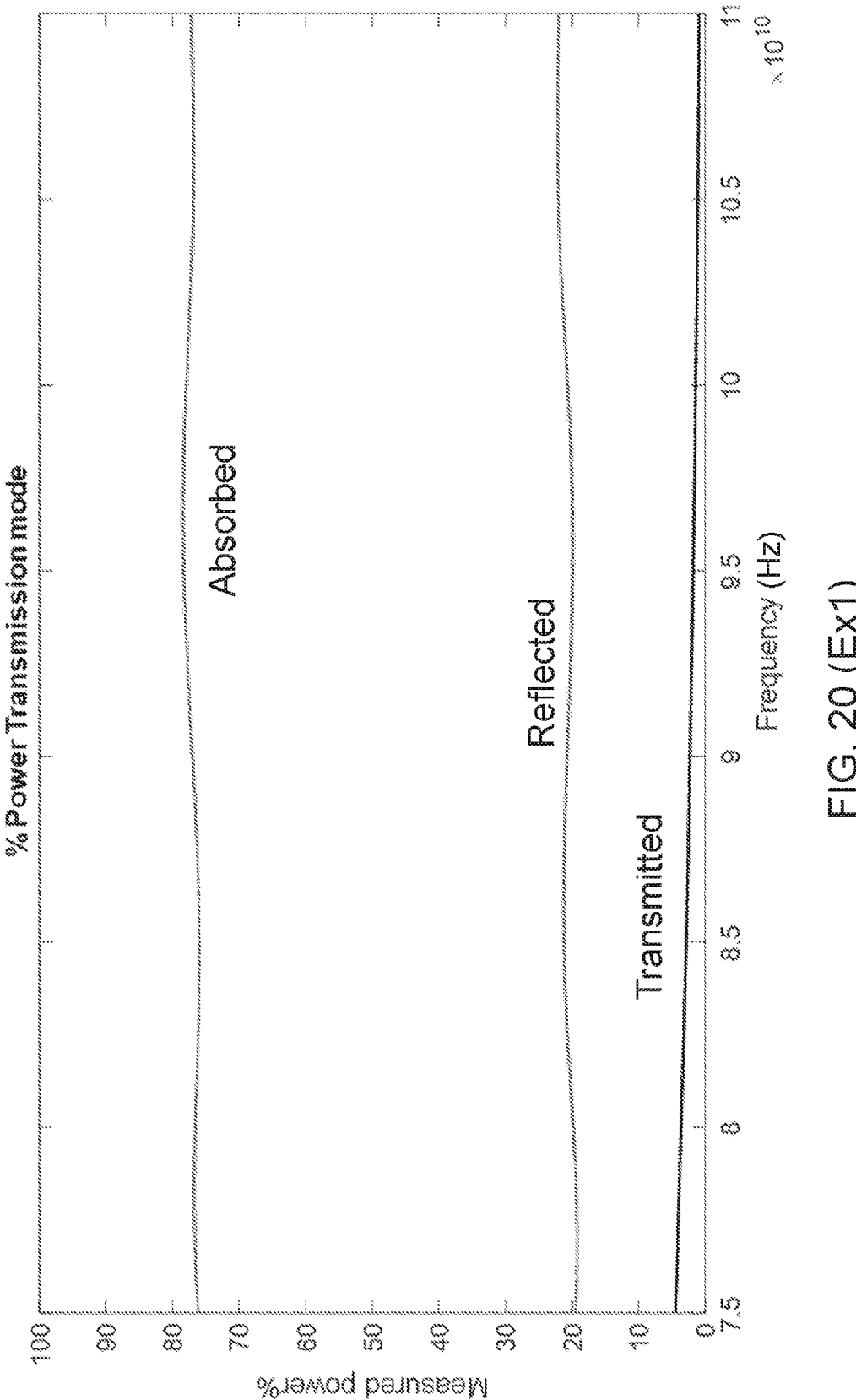
FIG. 20 (Ex1)

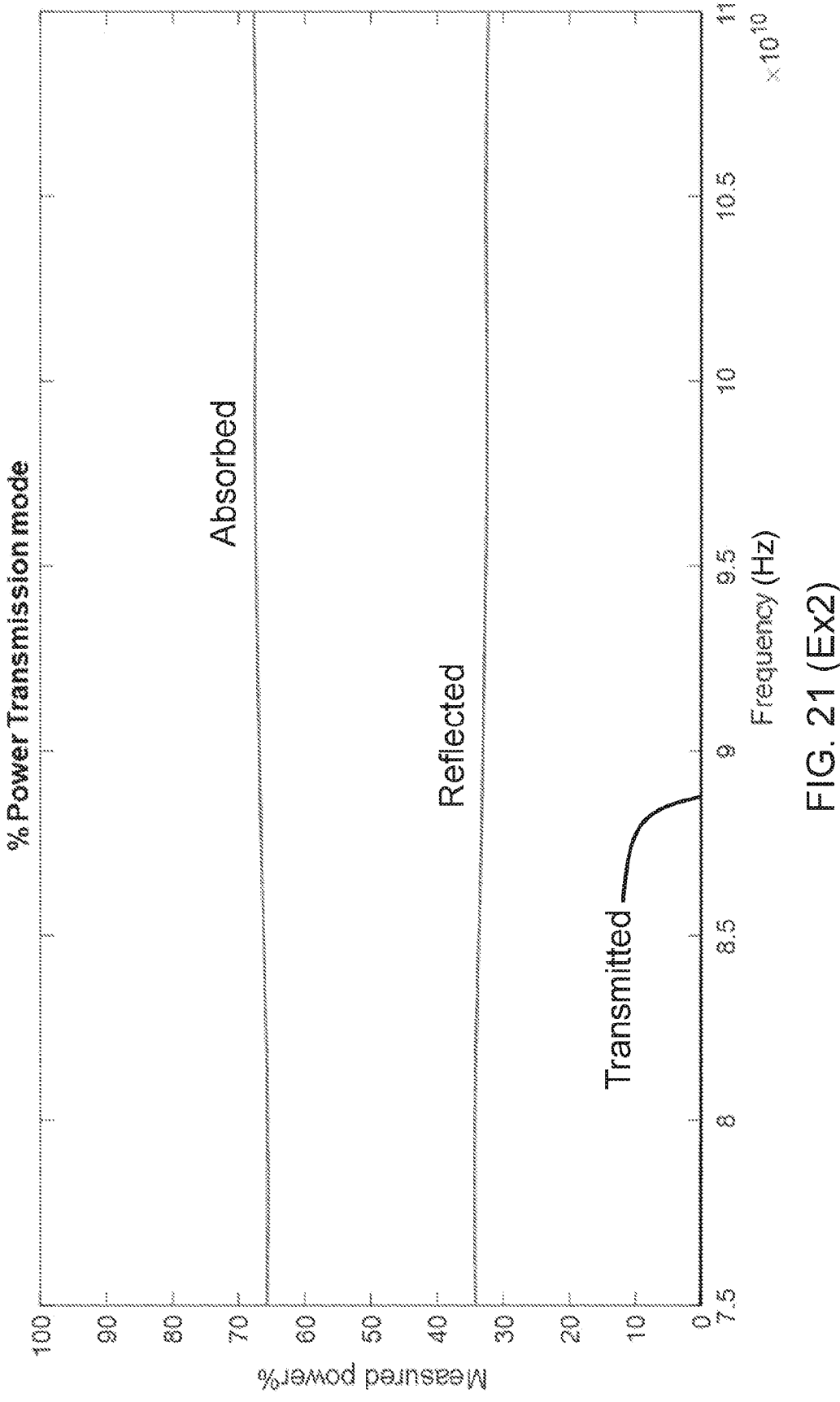
FIG. 21 (Ex2)

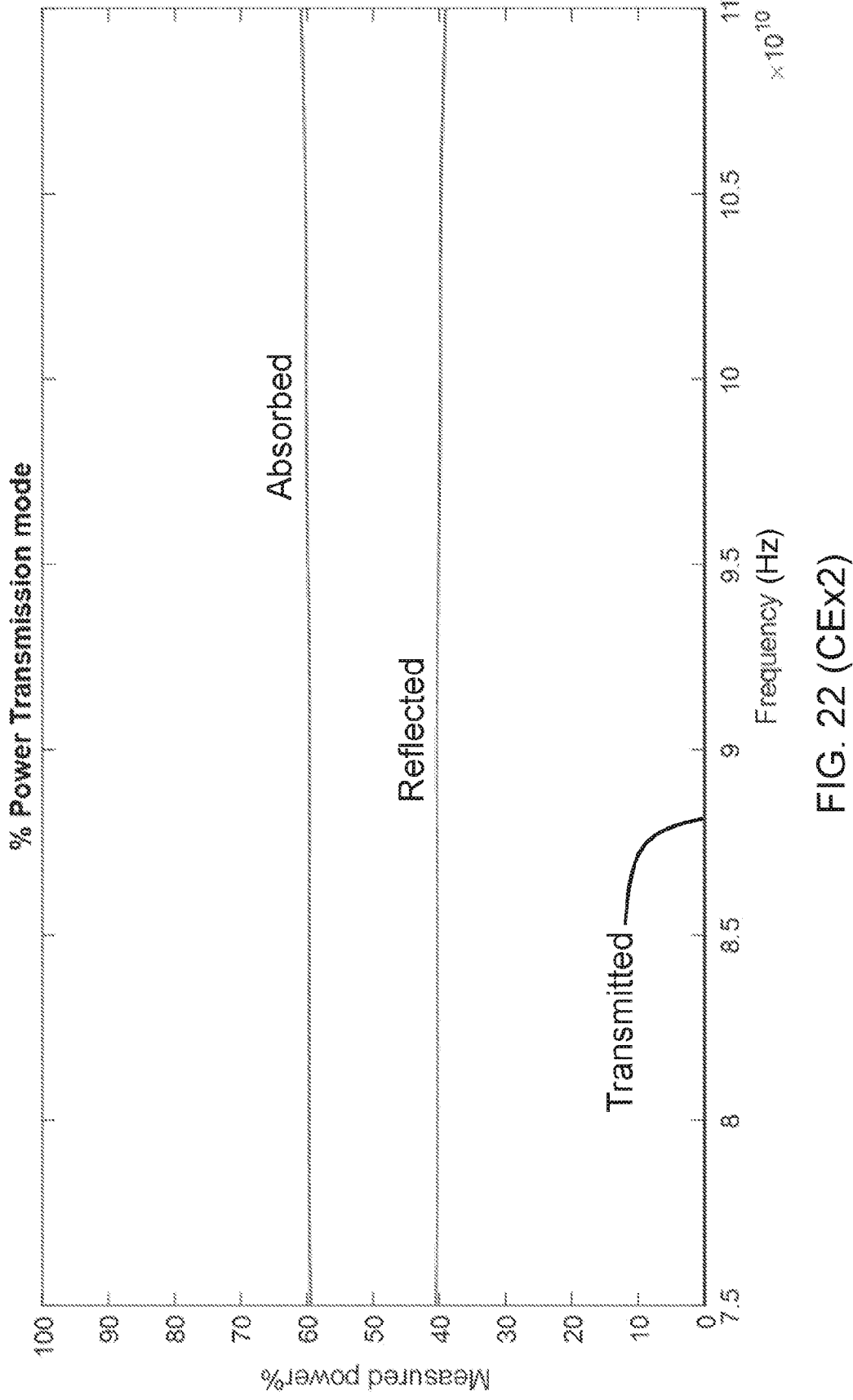
FIG. 22 (CEx2)

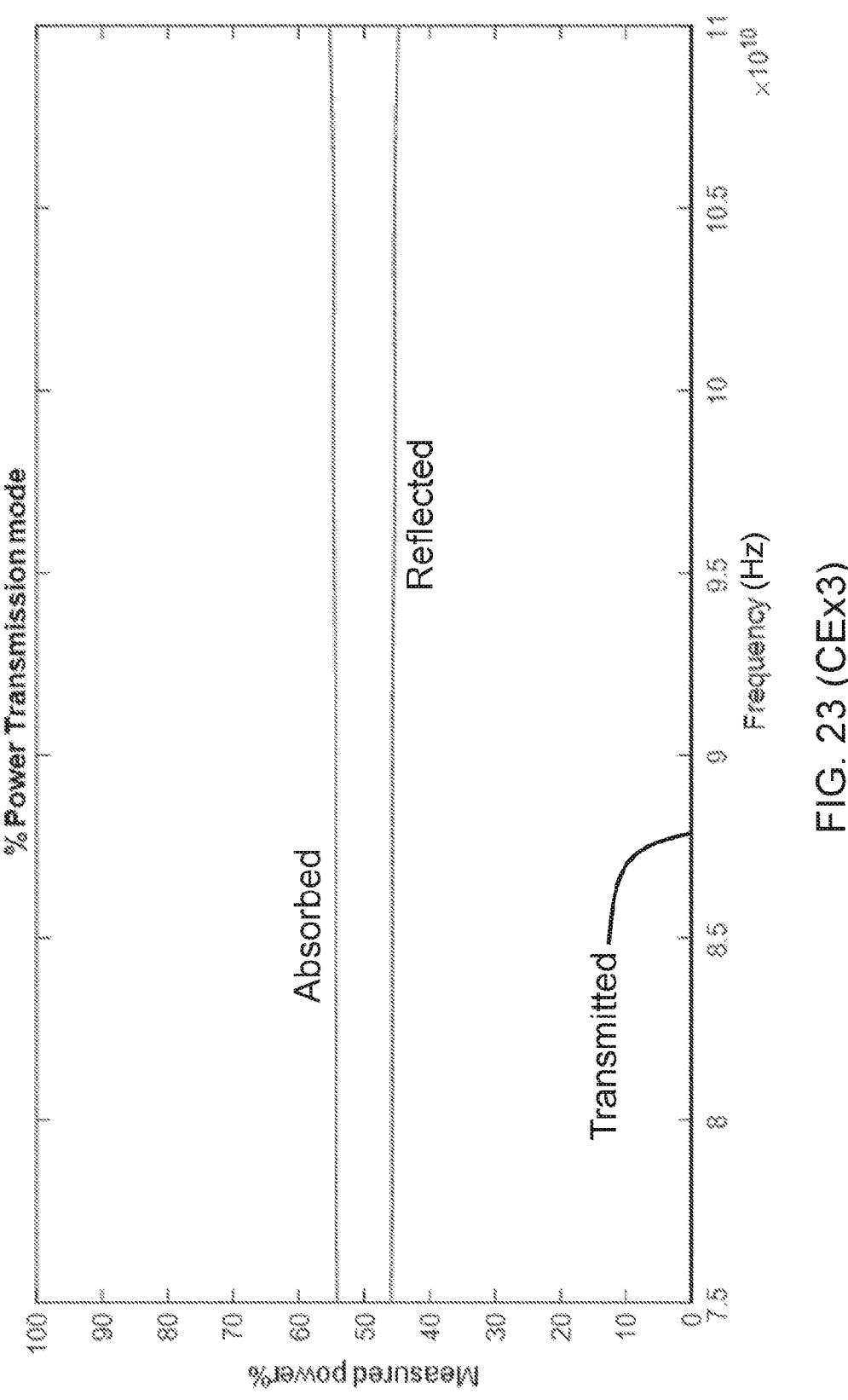
FIG. 23 (CEx3)

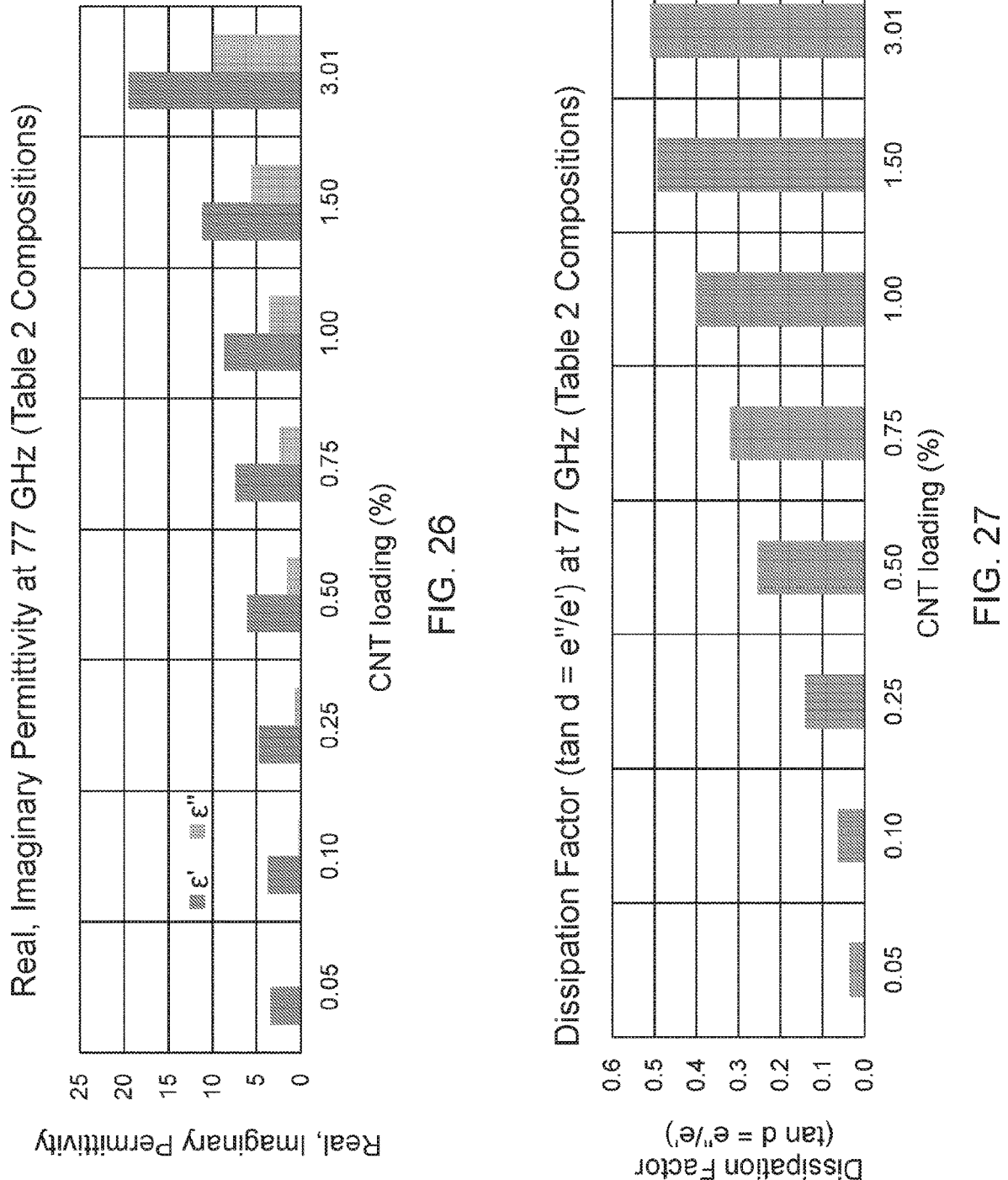

Equation for the Reflection Loss of a Single-Layer
Microwave Absorber with Metal Backing $$R(dB) = 20 \cdot \log \left| \frac{iA\tan(kd) - 1}{iA\tan(kd) + 1} \right|$$

$S_{11}$ $$A = \sqrt{\frac{\mu}{\varepsilon}}$$

$$k = i\frac{2\pi f}{c}\sqrt{\mu\varepsilon}$$

1

POLYESTER COMPOSITIONS INCLUDING CARBON NANOTUBES AS MICROWAVE ABSORBERS IN SENSOR APPLICATIONS

CROSS-REFERENCE TO RELATED APPLICATION

This application is the National Stage of International Application No. PCT/IB2022/056288 filed Jul. 7, 2022, which claims priority to and the benefit of European Application No. 21184608.4 filed Jul. 8, 2021, the disclosures of which are incorporated herein by this reference in their entireties.

FIELD OF THE DISCLOSURE

The present disclosure relates to thermoplastic compositions including a polyester and a carbon nanotube (CNT) filler suitable for use as microwave absorbers in sensor applications.

BACKGROUND OF THE DISCLOSURE

The automotive industry is increasingly making use of electronic radar sensors to provide drivers assistance with features such as adaptive cruise control, parking/lane change assist, back-up warning, blind spot detection, collision avoidance, and many others. In order for these sensors to operate effectively, they need to be protected from spurious sources of electromagnetic radiation. Radar sensors for automotive include radome-type plastic components, which are mostly transparent to microwave radiation, and absorber-type plastic components, which trap microwave energy in a certain frequency range to protect the sensor from outside radiation interference. These plastics components are usually injection molded into the final part using relatively high injection pressures and melt temperatures. Microwave absorbing materials made from carbon black powder, graphite or carbon fibers usually require of relatively large quantities of the carbon filler to provide enough shielding interference in the K-band and W-band of the electromagnetic spectrum.

Electronic radar sensors are used in the automotive industry to aid drivers in operations such as cruise control, lane change, self-parking, blind spot detection and many others. These sensors need to be protected from electromagnetic interference that can damage their normal operation. Metals (aluminum, stainless steel) are the most common materials used for microwave (MW) shielding, but they are heavy, expensive and demand of complex processing to be shaped into a final part.

Polymer/carbon composites are preferred due to their low density, low cost, easy shaping, and manufacturability into high volume molded parts. Carbon fillers trap or deflect MW radiation in enclosure walls protecting the electronic sensors inside the cavity. Relatively high dielectric constant and electrical conductivity, and large dielectric and magnetic losses are some of the features required for materials used in microwave shielding.

Microwave radiation (~1-300 GHz frequency, ~300-1 mm wavelength) is the most common source of EM energy used in the operation of radar sensors for automotive applications. Metals (e.g., aluminum and stainless steel), polymer composite materials containing metallic fillers, such as aluminum flakes, stainless steel fibers and silver-coated polyamide fibers, metalized coatings, inherently conductive polymers (polyacetylene, polypyrrole, polythiophene, polyaniline, etc.), silicon carbide, ferrites ($Fe_2O_3$+Ni/Zn/Cd/Co oxide), and carbonyl iron are some of the materials that are being used to shield automotive radar sensors from damaging microwave electromagnetic radiation.

There are several dielectric properties that radar designers consider when selecting materials for microwave radar interference. Complex permiftivity (real and imaginary parts), amount of radiation absorbed, reflected or transmitted by the material, shielding effectiveness, reflection loss and attenuation are only some of the material properties of interest for the manufacture of plastic components for radar sensor applications. Frequency of the incoming radiation and material thickness are also important when trapping microwave energy that if not eliminated or minimized can interfere with the normal operation of the automotive electronic sensors.

Carbon (e.g., powder, platelets, fibers) is emerging as the filler of choice to impart electromagnetic interference properties to polymers, which when unfilled are virtually transparent to microwave radiation. When used in under-the-hood automotive enclosures, for example, polymer-carbon composites can protect the radar sensors located inside the enclosure by preventing the electromagnetic radiation from an outside or inside source to deteriorate the sensor's electronic performance.

These and other shortcomings are addressed by aspects of the present disclosure.

SUMMARY

Aspects of the disclosure relate to thermoplastic compositions including: a thermoplastic polymer component including a polyester; and from greater than 0.10 wt % to about 1.95 wt % of a carbon nanotube (CNT) filler. A 6 in×8 in×⅛ in molded sample of the composition has a percent Absorbed Power measured in Transmission mode of at least 60% when observed at a 77 GHz frequency according to a Free Space method. In some aspects the polyester includes polybutylene terephthalate (PBT). Further aspects include articles (e.g., a radar sensor, a camera, an electronic control unit, etc.) including a molded part including a microwave absorbing material (absorber). The article may have at least two openings to allow the transmission of microwave radiation between a transmitting antenna and a receiving antenna located in/on the printed circuit board of the sensor.

In yet further aspects the disclosure relates to methods for forming a thermoplastic composition, including: combining a thermoplastic polymer component including a polyester with from greater than 0.10 wt % to about 1.95 wt % of a carbon nanotube (CNT) filler to form a mixture; and molding the mixture to form the thermoplastic composition. A 6 in×8 in×⅛ in molded sample of the thermoplastic composition has a percent Absorbed Power measured in Transmission mode of at least 60% when observed at a 77 GHz frequency according to a Free Space method.

BRIEF DESCRIPTION OF THE FIGURES

In the drawings, which are not necessarily drawn to scale, like numerals may describe similar components in different views. Like numerals having different letter suffixes may represent different instances of similar components. The drawings illustrate generally, by way of example, but not by way of limitation, various aspects discussed in the present document.

FIG. 3 is a graph illustrating permittivity (real and imaginary parts) as a function of CNT loading observed at a 77 GHz frequency for example and comparative compositions according to aspects of the disclosure.

FIG. 4 is a graph illustrating dissipation factor (Df), or tan δ, as a function of CNT loading observed at a 77 GHz frequency for example and comparative compositions according to aspects of the disclosure.

FIG. 5 is a graph illustrating attenuation constant as a function of CNT loading observed at a 77 GHz frequency for example and comparative compositions according to aspects of the disclosure.

FIG. 6 is a graph illustrating total shielding effectiveness as a function of CNT loading observed at a 77 GHz frequency for example and comparative compositions according to aspects of the disclosure.

FIG. 20 is a graph illustrating absorbed, reflected and transmitted power as a function of frequency in the W-band (75-110 GHz) for example composition Ex1 according to aspects of the disclosure.

FIG. 21 is a graph illustrating absorbed, reflected and transmitted power as a function of frequency in the W-band (75-110 GHz) for example composition Ex2 according to aspects of the disclosure.

FIG. 22 is a graph illustrating absorbed, reflected and transmitted power as a function of frequency in the W-band (75-110 GHz) for comparative composition CEx2.

FIG. 23 is a graph illustrating absorbed, reflected and transmitted power as a function of frequency in the W-band (75-110 GHz) for comparative composition CEx3.

FIG. 26 is a graph illustrating permittivity (real and imaginary parts) as a function of CNT loading observed at a 77 GHz frequency for example and comparative compositions according to aspects of the disclosure.

FIG. 27 is a graph illustrating dissipation factor (Df), or tan δ, as a function of CNT loading observed at a 77 GHz frequency for example and comparative compositions according to aspects of the disclosure.

DETAILED DESCRIPTION

Figures 1A, 1B:
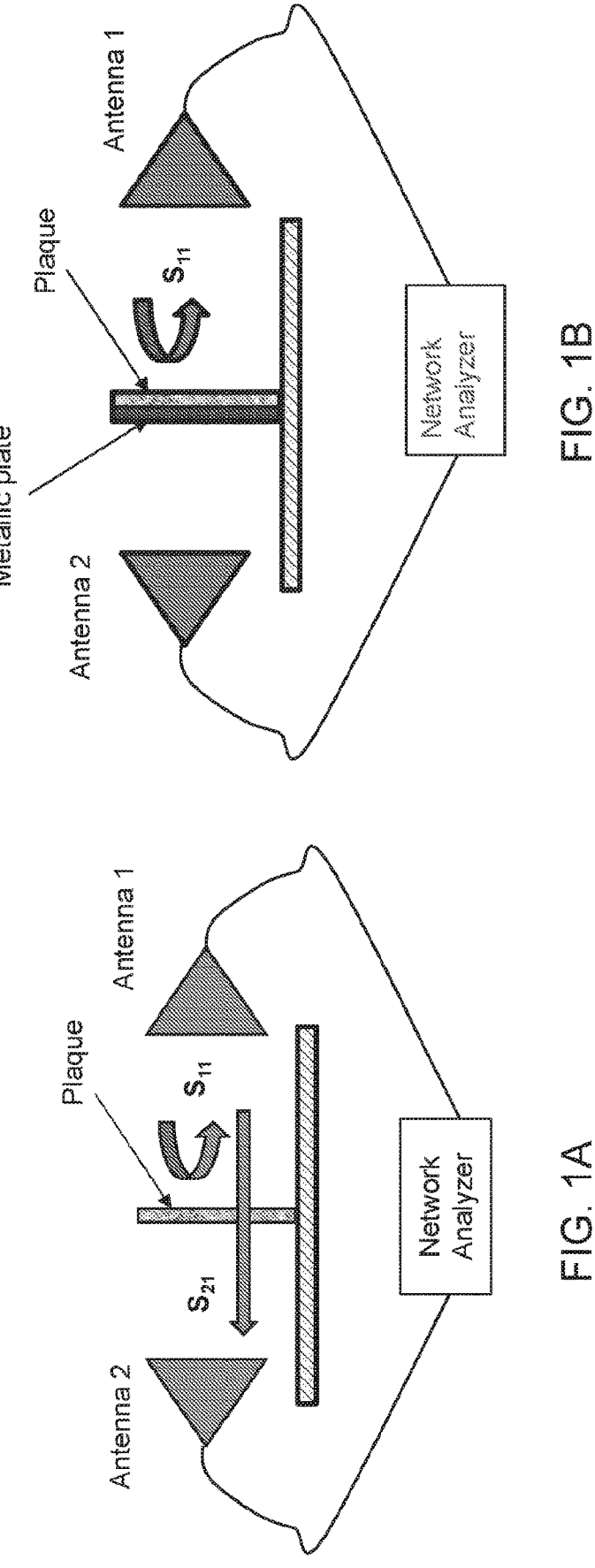
FIGS. 1A and 1B are schematic depictions of the apparatus used to determine the dielectric properties of the materials of this disclosure using the Free Space Method for un-backed and metal-backed samples, respectively.

This present disclosure describes plastic composite materials including relatively low levels of multi-wall carbon nanotubes that can be used to manufacture microwave absorbers for sensors such as automotive radar sensors, and that can be injection molded using conventional molding processes.

Carbon nanotubes are preferred over carbon powder, graphite or carbon fibers since they provide adequate microwave interference performance at relatively low loadings. Lower loadings of carbon, for example, would result in improvements to the ductility, impact strength, surface aesthetics, and flow of these materials under high shear rate conditions.

Another aspect of the disclosure is a component of an automotive radar sensor (plate, enclosure, cover, etc.), which is molded from a material including a polymer and carbon nanotubes as a microwave absorbing filler, with the molded part having certain design, average thickness, microwave absorption efficiency, absorption bandwidth, shielding effectiveness, attenuation and electrical surface and volume resistivity properties.

Further aspects of the disclosure include articles (e.g., a radar sensor, a camera, an electronic control unit, etc.) including a molded part including a microwave absorbing material (absorber). The article may have at least two openings to allow the transmission of microwave radiation between a transmitting antenna and a receiving antenna located in/on the printed circuit board of the sensor.

The present disclosure can be understood more readily by reference to the following detailed description of the disclosure and the Examples included therein. In various aspects, the present disclosure relates to thermoplastic compositions including: a thermoplastic polymer component including a polyester; and from greater than 0.10 wt % to about 1.95 wt % of a carbon nanotube (CNT) filler. A 6 in×8 in×⅛ in molded sample of the composition has a percent Absorbed Power measured in Transmission mode of at least 60% when observed at a 77 GHz frequency according to a Free Space method.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting.

Various combinations of elements of this disclosure are encompassed by this disclosure, e.g., combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

Definitions

It is also to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a polyester" includes mixtures of two or more polyester polymers.

As used herein, the term "combination" is inclusive of blends, mixtures, alloys, reaction products, and the like.

Ranges can be expressed herein as from one value (first value) to another value (second value). When such a range is expressed, the range includes in some aspects one or both of the first value and the second value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the designated value, approximately the designated value, or about the same as the designated value. It is generally understood, as used herein, that it is the nominal value indicated±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

The terms "residues" and "structural units", used in reference to the constituents of the polymers, are synonymous throughout the specification.

As used herein the terms "weight percent," "wt %," and "wt. %," which can be used interchangeably, indicate the percent by weight of a given component based on the total weight of the composition, unless otherwise specified. That Thermoplastic Compositions In some aspects a polyester (e.g., polybutylene terephthalate (PBT)) masterbatch including a fixed loading of multi wall carbon nanotubes (CNT), is combined with fresh, unfilled polyester resin to dilute the original masterbatch to form blends of varying concentrations of nanotubes. The carbon nanotubes impart electrical conductivity and microwave absorbing properties to the composition. One masterbatch composition suitable for use in aspects of the disclosure is PLASTICYL™ PBT1501 (available from NANOCYL), which is a multiwall carbon nanotube (MWCNT) PBT masterbatch containing 15 percent by weight of nanotubes. NANOCYL® nanotubes are thin, multi-wall carbon nanotubes produced via a catalytic chemical vapor deposition (CCVD) process. The carbon nanotubes are tube-shaped materials that are exclusively composed of carbon atoms having a nanometer size diameter. The graphite layers can be visualized somewhat like a rolled-up chicken wire with a continuous unbroken hexagonal mesh and carbon atoms at the apexes of the hexagons. From action of van der Waals forces, carbon nanotubes have a tendency to cluster into bundles or agglomerates. Consequently, carbon nanotubes look like a black powder. At nanoscale, however, they have a spaghetti-like structure.

One advantage of carbon nanotubes is that compositions including them have improved mechanical properties as compared to other conductive fillers such as carbon black or graphite due to their high aspect ratio resulting in a relatively low amount of nanotubes needed to reach a specific electrical conductivity. Nanotubes typically increase the viscosity more than carbon black at equal loading, but much lower quantities of nanotubes are required for processing in most cases. Other benefits of CNTs include: high electrical conductivity; good processability; retention of mechanical properties; high recyclability in thermoplastics; and good thermal dissipation properties (among several others). Specific properties of NANOCYL's NC7000™ CNTs include:

Specific Characterization of NC7000™

| PROPERTIES | UNIT | VALUE | METHOD OF MEASUREMENT |
|---|---|---|---|
| Average diameter | $10^{-9}$ m | 9.5 | Transmission Electron Microscopy (TEM) |
| Average length | μm | 1.5 | Transmission Electron Microscopy (TEM) |
| Carbon purity | % | 90 | Thermogravimetric analysis (TGA) |
| Transition Metal oxide | % | <1% | Inductively Coupled Plasma Mass Spectrometry (ICP-MS) |
| Amorphous carbon | — | * | High resolution Transmission Electron Microscopy (HRTEM) |
| Surface Area | $m^2/g$ | 250-300 | BET surface area analysis |
| Volume resistivity | Ω · cm | $10^{-4}$ | Internal test method (resistivity on powder) |

*Pyrolytically deposited carbon on the surface of the NC7000 is, unless otherwise specified, all wt % values are based on the total weight of the composition. It should be understood that the sum of wt % values for all components in a disclosed composition or formulation are equal to 100.

Unless otherwise stated to the contrary herein, all test standards are the most recent standard in effect at the time of filing this application.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

From NANOCYL's NC7000™ Technical Data Sheet.

In specific aspects the disclosure relates to thermoplastic compositions including: a thermoplastic polymer component including a polyester; and from greater than 0.10 wt % to about 1.95 wt % of a carbon nanotube (CNT) filler. A 6 in×8 in×⅛ in molded sample of the composition has a percent Absorbed Power measured in Transmission mode of at least 60% when observed at a 77 GHz frequency according to a Free Space method. As used herein, a "molded sample" refers to a 6 inch×8 inch×⅛ inch injection molded sample of the composition.

The Free Space Method used to measure the dielectric properties of the compositions of this disclosure includes a vector network analyzer, two antennae facing each other with a sample holder placed equidistant between them. The fundamental experimental quantities produced by the Free Space Method are the so-called Scattering parameters, or S-parameters, which are used to describe the input-output relationship between the different ports of an electric network in terms of amplitude and phase versus frequencies. The S-parameters are usually identified by a two-number subscript, with the first number in the subscript referring to the responding port, while the second number refers to the incident port. Thus, $S_{21}$ means the response at port 2 due to a signal at port 1. The Scattering parameters are complex numbers having a real part and an imaginary part, and they describe the amount of microwave radiation that is either reflected off the sample or transmitted through the sample. The Scattering parameter Si for Reflection, for example, represents a signal that originates in antenna 1 and that is received back at the same antenna after impinging on the sample and is reflected off. Similarly, the Scattering parameter $S_{21}$ for Transmission represents a signal that originates in antenna 1 and is received by antenna 2 after being transmitted through the material under test. Scattering parameters for Reflection and Transmission that represent a signal that originates at antenna 2, $S_{22}$ for Reflection and $S_{12}$ for Transmission, can also be defined. The S-parameter matrix can be used to determine reflection coefficients and transmission gains from both sides of a two-port network for which four S-parameters, $S_{11}$, $S_{22}$, $S_{21}$, and $S_{12}$, as defined before, can be identified. A software is then used to convert the Scattering parameter output of the network analyzer to dielectric properties. Free-space measurement techniques provide a method for determining the dielectric permittivity and magnetic permeability of the magneto-dielectric material under test. These methods are contactless, that is the material under test does not make direct contact with any active component of the equipment involved in the measurement.

A schematic depiction of the apparatus used to determine the dielectric properties of the materials of this disclosure using the Free Space Method for un-backed and metal-backed samples is shown in FIGS. 1A and 1B, respectively. Injection molded plaques of 6 inch×8 inch×⅛ inch dimensions are used for these Free Space dielectric measurements.

Dielectric measurements using the Free Space Method can be performed in two different modes, the Transmission Mode and the Metal-backed Reflection Mode. The Transmission Mode of measurement allows the three types of radiation, namely Absorption into the sample, Reflection off the sample, and Transmission through the sample to be measured. In the Metal-backed Reflection Mode of measurement, on the other hand, a metallic plate (stainless steel, aluminum, etc.) is placed between the material under test and the receiving antenna so transmission through the sample is almost completely suppressed, and only microwave Absorption into the material and microwave Reflection off the material can be evaluated. Since the combination of the two antennae in Transmission mode can only measure the Scattering parameter for Reflection, Si, and the Scattering parameter for Transmission, $S_{21}$, the amount (in percent) of radiation absorbed by the material under test is calculated as the difference between the total energy impinging on the sample (or 100%) and the sum of the amount (in percent) of radiation transmitted through the sample (measured from $S_{21}$, and reaching the receiving antenna) and reflected off the sample (measured from $S_{11}$, and returning back to the emitting antenna). In many applications, it is desirable to maximize percent Absorbed power, and to minimize percent Reflected power and percent Transmitted power when measurements are made using the Transmission mode. There are several dielectric properties that radar designers consider when selecting materials for microwave radar interference applications. Complex permittivity (real and imaginary parts), amount of radiation Absorbed, Reflected or Transmitted by the material, Shielding Effectiveness, Reflection Loss, and Attenuation are only some of the material properties of interest for the manufacture of plastic components for radar sensor applications. Frequency of the incoming radiation and material thickness are also important when trapping microwave energy that if not eliminated or minimized would interfere with the normal operation of the automotive electronic sensors.

Figure 2:
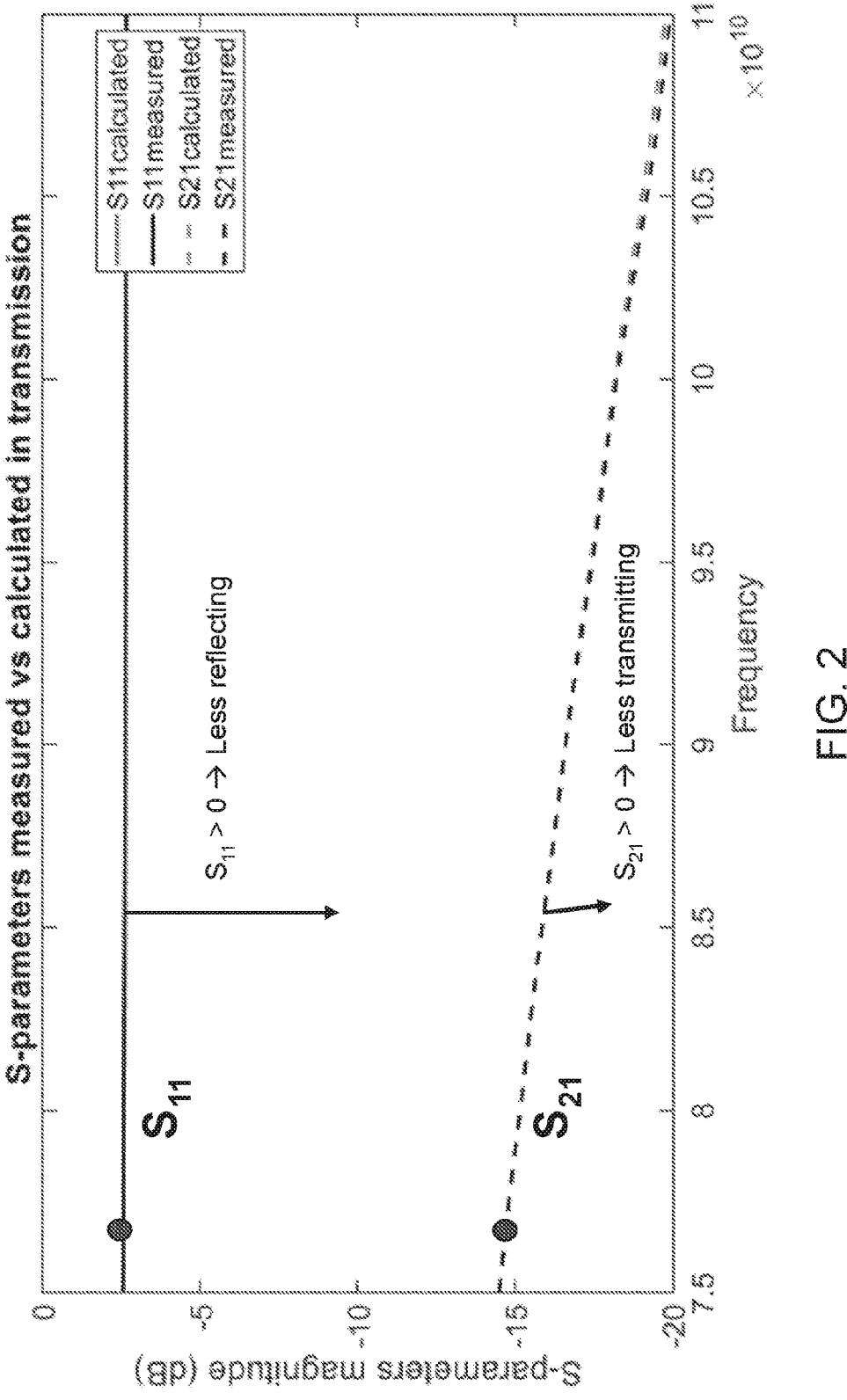
FIG. 2 shows a typical graph of the magnitude of the Scattering parameters (in dB) $S_{11}$ (for Reflection) and $S_{21}$ (for Transmission) of a carbon-based material used to absorb microwave radiation in the W-band at frequencies between 75 and 110 GHz.

FIG. 2 shows a typical graph of the magnitude of the Scattering parameters (in dB) $S_{11}$ (for Reflection) and $S_{21}$ (for Transmission) of a carbon-based material used to absorb microwave radiation in the W-band at frequencies between 75 and 110 GHz. In this graph, $S_{11}$ equal to zero dB indicates that the material shows no reflection loss (100% Reflecting), as it is the case of a metal plate made out of aluminum or stainless steel. Similarly, Sn equal to zero dB indicates that the material experiences no transmission loss (100% Transmitting), as it is the case for air. In this context, materials having a $S_{11}$ larger than 0 dB would be less than 100% reflecting (they would experience some loss in reflection), and materials having a Sn larger than 0 dB would be less than 100% transmitting (they would experience some loss in transmission). The negative sign in the values of the S parameters indicates that energy has been lost, with larger negative numbers indicating larger losses. As the graph shows for 77 GHz of frequency, a $S_{11}$ equal to about −2.5 dB would indicate a Percent Reflected Power of 31.6%, a $S_{21}$ equal to about −15 dB would correspond to a Percent Transmitted Power of 0.1%, and by difference to 100% the Percent Absorbed Power would be equal to about 68.3%.

In its most generic definition, Shielding Effectiveness (SE) of a material describes the ability of the material to reduce the electromagnetic radiation around it by blocking the field with barriers or shields made of conductive and/or magnetic components. In these cases, the shielding can be effected by either absorbing or reflecting part or all of the electromagnetic radiation impinging on the material to be protected. The ability of the shielding material to block this harmful radiation usually depends on the frequency (or wavelength) of the incoming radiation, thickness of the protective layer, and it is expected to vary with the electrical conductivity and/or dielectric properties of the material. The total Shielding Effectiveness of a material is the result of its reflection, absorption, and internal reflection losses, and it is represented by the following equation:

$$SE_T(dB) = SE_A + SE_R + SE_M$$

For total shielding efficiencies larger than 10 dB, the shielding effectiveness due to multiple reflections $SE_M$ is usually negligible. Therefore, the Total Shielding Effectiveness is reduced to:

$$SE_T(dB) = SE_A + SE_R,$$

$SE_A$ and $SE_R$ are calculated directly from S-parameters measurements using a vector network analyzer as follows:

$$SE_R = -10\log\left(1 - |S_{11}|^2\right)$$

-continued and $$SE_A = -10 \log\left(\frac{|S_{21}|^2}{1 - |S_{11}|^2}\right)$$

In the above equations, $S_{11}$ is the Scattering Parameter for Reflection, and $S_{21}$ is the Scattering Parameter for Transmission. If we replace the above expressions for $SE_R$ and $SE_A$ into the equation for $SE_T$, the Total Shielding Effectiveness can be written as $SE_T = -10 \log(|S_{21}|^2)$, which is analogous to the expressions for Transmission Loss or Insertion loss. Similar formulas can be used to calculate other dielectric properties, such as Attenuation, Reflection and Insertion Loss, Power Absorbed, and many others, in terms of the Scattering parameters. The formulas used to calculate the properties of the materials of this disclosure are provided below.

Reflection and Transmission Coefficients:

Equation of the Reflection Coefficient:

$$\Gamma = x \pm \sqrt{x^2 - 1}$$

In the equation above, $$x = \frac{S_{11}^2 - S_{21}^2 + 1}{2S_{11}},$$

and the sign is selected with the constraint $|\Gamma_{max}| = 1$.

Equation of the Transmission Coefficient:

$$T = e^{-\gamma d} = \frac{S_{11} + S_{21} - \Gamma}{1 - (S_{11} + S_{21})\Gamma}$$

where, $\gamma$ represents the Propagation Constant, and d is the thickness of the plaque.

Complex Relative Dielectric Permittivity:

$$\widetilde{\epsilon_r} = \epsilon' - j\epsilon'',$$

$$\epsilon'' = \frac{\sigma}{\omega\epsilon_0}$$

where, $\sigma$ is the conductivity of the material, $\omega$ is the angular frequency, and $\epsilon_0$ is the free-space permittivity $$\left(\epsilon_0 = \frac{10^{-9}}{36\pi} F/m\right).$$

Loss Tangent: $\tan|\delta_d| = \frac{\epsilon''}{\epsilon'}$

Propagation Constant: $\gamma = \alpha + j\beta$, where, $\gamma$ is calculated using the extracted Complex Permittivity and Complex Permeability as:

$$\gamma = \frac{j\omega}{c}\sqrt{\widetilde{\mu_r}\widetilde{\epsilon_r}},$$

where c represents the speed of light in free space ($c = 3 \times 10^8$ m/s).

The Attenuation Constant, $\alpha$, causes a signal amplitude to decrease along a transmission path, and it is calculated as $\alpha = \text{Real}(\gamma)$ (Np/m, or Nepers/m), and then plotted in dB/cm using:

$$\alpha \text{ (dB/cm)} = -0.086859\, \alpha \text{ (Np/m)}$$

Return Loss (RL) and Insertion Loss (IL):

$$\text{Measured } RL \text{ (dB)} = 20 \log(|S_{11\,measured}|)$$

$$\text{Measured } IL \text{ (dB)} = 20 \log(|S_{21\,measured}|)$$

$$\text{Calculated } RL \text{ (dB)} = 20 \log(|S_{11\,calculated}|)$$

$$\text{Calculated } IL \text{ (dB)} = 20 \log(|S_{21\,calculated}|)$$

Calculated $S_{11}$ and $S_{21}$ Parameters [60]: The Reflection and Transmission Coefficients are calculated using the extracted Permittivity and Permeability as:

$$\Gamma = \frac{Z_s - Z_0}{Z_s + Z_0} = \frac{\sqrt{\frac{\widetilde{\mu_r}}{\widetilde{\epsilon_r}}} - 1}{\sqrt{\frac{\widetilde{\mu_r}}{\widetilde{\epsilon_r}}} + 1},$$

$$T = e^{-\gamma d} = e^{-j\frac{\omega}{c}\sqrt{\widetilde{\mu_r}\widetilde{\epsilon_r}}\,d}$$

where, $\omega$ represents the angular frequency, c is the speed of light in free space, d is the thickness of the plaque, and $S_{11}$ and $S_{21}$ parameters are then calculated using:

$$S_{11}(\omega) = \frac{(1 - T^2)\Gamma}{1 - T^2\Gamma^2}$$

$$S_{21}(\omega) = \frac{(1 - \Gamma^2)T}{1 - T^2\Gamma^2}$$

Percent Power: Since microwave Absorption cannot be measured directly, only Reflection (from $S_{11}$) and Transmission (from $S_{21}$), the Percent Absorbed Power can be calculated from:

$$P_{Incident} = P_{Reflected} + P_{Transmitted} + P_{Absorbed}$$

$$1 = |S_{11}|^2 + |S_{21}|^2 + P_{absorbed}$$

Scattering Parameter for Reflection in Metal-backed Reflection Mode: $S_{11}$ is calculated using the Transmission Line model:

$$S_{11} = \frac{Z_d \tanh(\gamma d) - 1}{Z_d \tanh(\gamma d) + 1}$$

-continued

Reflection Loss (dB) = $20 \log (|S_{11}|)$, where $$Z_d = \sqrt{\hat{\mu}_r} / \sqrt{\hat{\epsilon}_r},$$

$$\gamma = \frac{j\omega}{c} \sqrt{\hat{\mu}_r \hat{\epsilon}_r}$$

Figure 33:
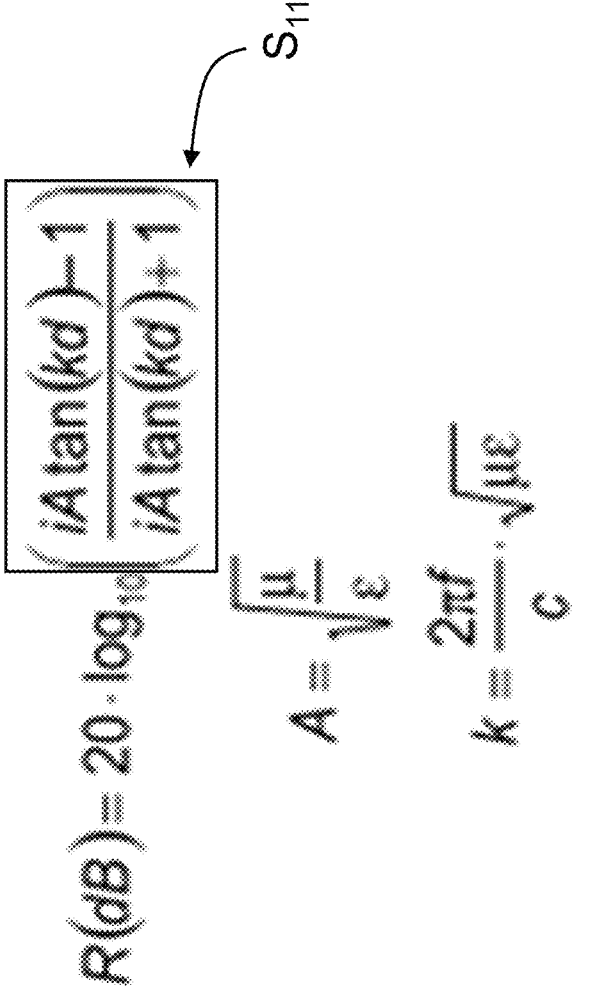
FIG. 33 shows an equation for the reflection loss of a single-layer microwave absorber with a metal backing.

$\hat{\epsilon}_r$ is Complex Relative Dielectric Permittivity=$\epsilon'$–$j\epsilon''$, and $\hat{\mu}_r$ is the Permeability (=1 for non-magnetic materials), which resembles the equation for the Reflection Loss of a single-layer microwave absorber with metal backing, as shown in FIG. 33.

Suitable polyesters include, but are not limited to, poly-butylene terephthalate (PBT), polyethylene terephthalate (PET), poly(cyclohexylenedimethylene terephthalate) (PCT), polyethylene terephthalate glycol (PETG), polycy-clohexylene dimethylene terephthalate glycol (PCTG), polycyclohexylene dimethylene terephthalate acid (PCTA), polyethylene naphthalate (PEN), polybutylene naphthalate (PBN), copolymers thereof, or a combination thereof. Suitable polyester components include, but are not limited to, polybutylene terephthalate (PBT), polyethylene terephtha-late (PET), poly(cyclohexylenedimethylene terephthalate) (PCT), polyethylene terephthalate glycol (PETG), polycy-clohexylene dimethylene terephthalate glycol (PCTG), polycyclohexylene dimethylene terephthalate acid (PCTA), copolymers thereof, or a combination thereof. PCT is a crystalline polyester formed from cyclohexanedimethanol (CHDM) and either dimethyl terephthalate (DMT) or tere-phthalic acid (TPA). PETG and PCTG are copolyesters formed by including ethylene glycol (EG) in the polymer-ization reaction. PETG is formed if less than 50% of the diol content in the copolyester is CHDM; PCTG is formed if greater than 50% of the diol content in the copolyester is CHDM. PCTA is formed by including additional diacids such as isophthalic acid (IPA). In a particular aspect the polyester component includes PBT.

The CNT filler may in some aspects have an average diameter of about 5-15 nanometers (nm), a surface area of at least 100 square meters per gram (m²/g), and/or a volume resistivity less than $10^{-3}$ Ohm·centimeters (Ω·cm). Exem-plary CNTs are available from Nanocyl (e.g., NC7000™). In specific aspects the CNT filler is in a form of a masterbatch. In particular aspects the CNT filler does not include CNT powder.

The CNT filler may be present in the composition in an amount of from about 0.01 wt % to about 1.95 wt %. In some aspects the composition includes from 0.10 wt % to 1.95 wt %, or from greater than 0.10 wt % to about 1.95 wt %, or from about 0.25 wt % to about 1.95 wt %, or from greater than 0.25 wt % to about 1.95 wt %, or from greater than 0.25 wt % to about 1.0 wt %, or from greater than 0.25 wt % to less than 1.0 wt %, of the CNT filler.

In certain aspects the composition includes a polycarbon-ate-siloxane copolymer. The polycarbonate-siloxane copo-lymer may in some aspects be present in an amount of from about 5 wt % to about 45 wt %, or from about 5 wt % to about 25 wt %, or from about 15 wt % to about 25 wt %, or about 20 wt %. In a particular aspect the polycarbonate-siloxane copolymer has a siloxane content of about 20 wt %. Exemplary polycarbonate-siloxane copolymers suitable for use in aspects of the disclosure are EXL copolymers avail-able from SABIC, which have exemplary siloxane contents of 6 wt % or 20 wt %.

The composition includes at least one additional additive in some aspects. The at least one additional additive may include, but is not limited to, an acid scavenger, an anti-drip agent, an antioxidant, an antistatic agent, a colorant, a de-molding agent, a flow promoter, a lubricant, a mold release agent, a plasticizer, a quenching agent, a flame retardant, a UV reflecting additive, an impact modifier, a blowing agent, a reinforcing agent, or a combination thereof. The at least one additional additive may be included in the thermoplastic composition in any amount that will not significantly adversely affect the desired properties of the composition. In specific aspects the at least one additional additive does not include a chain extender. In further aspects the at least one additional additive does not include a dispersant. In yet further aspects the at least one additional additive does not include a hardening agent.

In certain aspects the composition has a volume electrical resistivity of at least $10^{11}$ Ω·cm. Volume electrical resistivity may be determined in accordance with ASTM D257. In further aspects the composition has a volume electrical resistivity of at least $10^{12}$ Ω·cm, or at least $10^{13}$ Ω·cm, or at least $10^{14}$ Ω·cm, or from $10^{11}$ Ω·cm to $10^{15}$ Ω·cm.

In some aspects a 6 in×8 in×⅛ in molded sample of the composition has a percent Absorbed Power measured in Transmission mode of at least 60% when observed at frequencies of from 75 GHz to 110 GHz according to a Free Space method. In other aspects a molded sample of the composition has a percent Absorbed Power measured in Transmission mode of at least 61%, or at least 62%, or at least 63%, or at least 64%, or at least 65%, or at least 66%, or at least 67%, or at least 68%, or at least 69%, or at least 70%, or at least 71%, or at least 72%, or at least 73%, or at least 74%, or at least 75%, or from 60-85%, or from 65-85%, or from 70-85%, or from 74-85%, when observed at fre-quencies of from 75 GHz to 110 GHz according to a Free Space method.

In a specific aspect the composition includes from greater than 0.25 wt % to less than 1 wt % of the CNT filler, and a 6 in×8 in×⅛ in molded sample of the composition has a Percent Absorbed Power measured in Transmission mode of at least 74% when observed at a 77 GHz frequency accord-ing to a Free Space method.

Methods of Manufacture

The one or any foregoing components described herein may be first dry blended with each other, or dry blended with any combination of foregoing components, then fed into an extruder from one or multi-feeders, or separately fed into an extruder from one or multi-feeders. The fillers used in the disclosure may also be first processed into a masterbatch, then fed into an extruder. The components may be fed into the extruder from a throat hopper or any side feeders.

The extruders used in the disclosure may have a single screw, multiple screws, intermeshing co-rotating or counter rotating screws, non-intermeshing co-rotating or counter rotating screws, reciprocating screws, screws with pins, screws with screens, barrels with pins, rolls, rams, helical rotors, co-kneaders, disc-pack processors, various other types of extrusion equipment, or combinations including at least one of the foregoing.

The components may also be mixed together and then melt-blended to form the thermoplastic compositions. The melt blending of the components involves the use of shear force, extensional force, compressive force, ultrasonic energy, electromagnetic energy, thermal energy or combi-nations including at least one of the foregoing forces or forms of energy.

The barrel temperature on the extruder during compounding can be set at the temperature where at least a portion of the polymer has reached a temperature greater than or equal to about the melting temperature, if the resin is a semi-crystalline organic polymer, or the flow point (e.g., the glass transition temperature) if the resin is an amorphous resin.

The mixture including the foregoing mentioned components may be subject to multiple blending and forming steps if desirable. For example, the thermoplastic composition may first be extruded and formed into pellets. The pellets may then be fed into a molding machine where it may be formed into any desirable shape or product. Alternatively, the thermoplastic composition emanating from a single melt blender may be formed into sheets or strands and subjected to post-extrusion processes such as annealing, uniaxial or biaxial orientation.

The temperature of the melt in the present process may in some aspects be maintained as low as possible in order to avoid excessive thermal degradation of the components. In certain aspects the melt temperature is maintained between about 230° C. and about 350° C., although higher temperatures can be used provided that the residence time of the resin in the processing equipment is kept relatively short. In some aspects the melt processed composition exits processing equipment such as an extruder through small exit holes in a die. The resulting strands of molten resin may be cooled by passing the strands through a water bath. The cooled strands can be chopped into pellets for packaging and further handling.

In some aspects methods for forming a thermoplastic composition include: combining a thermoplastic polymer component including a polyester with from greater than 0.10 wt % to about 1.95 wt % of a carbon nanotube (CNT) filler to form a mixture; and molding the mixture to form the thermoplastic composition. A 6 in×8 in×⅛ in molded sample of the thermoplastic composition has a percent Absorbed Power measured in Transmission mode of at least 60% when observed at a 77 GHz frequency according to a Free Space method. In further aspects the step of molding the mixture includes at least one of extruding, injection molding, rotational molding, blow molding or thermoforming the mixture to form the thermoplastic composition.

Articles of Manufacture

In certain aspects, the present disclosure pertains to shaped, formed, or molded articles including the thermoplastic compositions. The thermoplastic compositions can be molded into useful shaped articles by a variety of means such as injection molding, extrusion, rotational molding, blow molding and thermoforming to form articles and structural components of, for example, personal or commercial electronics devices, including but not limited to cellular telephones, tablet computers, personal computers, notebook and portable computers, and other such equipment, medical applications, RFID applications, automotive applications, and the like. In a further aspect, the article is extrusion molded. In a still further aspect, the article is injection molded. In specific aspects the article is a microwave absorber for an internal or external radar sensor. In yet further aspects the article is a microwave absorber for a radar sensor, camera, or an electronic control unit. In certain aspects the article includes a transmitting antenna, a receiving antenna, and at least two openings to allow transmission of microwave radiation between the transmitting antenna and the receiving antenna.

Various combinations of elements of this disclosure are encompassed by this disclosure, e.g., combinations of elements from dependent claims that depend upon the same independent claim.

Aspects of the Disclosure

In various aspects, the present disclosure pertains to and includes at least the following aspects.

Aspect 1. A thermoplastic composition comprising, consisting of, or consisting essentially of:
a thermoplastic polymer component comprising a polyester; and
from about 0.01 wt % to about 1.95 wt % of a carbon nanotube (CNT) filler,
wherein a molded sample of the composition has a percent Absorbed Power measured in Transmission mode of at least 60% when observed at a 77 GHz frequency according to a Free Space method.

Aspect 2. The thermoplastic composition according to Aspect 1, wherein the polyester comprises polybutylene terephthalate (PBT), polyethylene terephthalate (PET), poly (cyclohexylenedimethylene terephthalate) (PCT), polyethylene terephthalate glycol (PETG), polycyclohexylene dimethylene terephthalate glycol (PCTG), polycyclohexylene dimethylene terephthalate acid (PCTA), polyethylene naphthalate (PEN), polybutylene naphthalate (PBN), copolymers thereof, or a combination thereof.

Aspect 3. The thermoplastic composition according to Aspect 1 or 2, wherein the composition comprises polybutylene terephthalate (PBT).

Aspect 4. The thermoplastic composition according to any of Aspects 1 to 3, wherein the CNT filler has an average diameter of about 5-15 nanometers (nm), a surface area of at least 100 square meters per gram (m$^2$/g), and a volume resistivity less than 10$^{-3}$ Ohm·centimeters (Ω·cm).

Aspect 5. The thermoplastic composition according to any of Aspects 1 to 4, wherein the composition has a volume electrical resistivity of at least 10$^{11}$ Ω·cm.

Aspect 6. The thermoplastic composition according to any of Aspects 1 to 5, wherein a molded sample of the composition has a percent Absorbed Power measured in Transmission mode of at least 65% when observed at frequencies of from 75 GHz to 110 GHz according to a Free Space method.

Aspect 7. The thermoplastic composition according to any of Aspects 1 to 6, wherein the composition comprises from about 0.01 wt % to about 1 wt % of the CNT filler, wherein a molded sample of the composition has a Percent Absorbed Power measured in Transmission mode of at least 75% when observed at a 77 GHz frequency according to a Free Space method.

Aspect 8. The thermoplastic composition according to any of Aspects 1 to 7, wherein the composition further comprises at least one additional additive.

Aspect 9. The thermoplastic composition according to Aspect 8, wherein the at least one additional additive comprises an acid scavenger, an anti-drip agent, an antioxidant, an antistatic agent, a chain extender, a colorant, a de-molding agent, a flow promoter, a lubricant, a mold release agent, a plasticizer, a quenching agent, a flame retardant, a UV reflecting additive, an impact modifier, a blowing agent, a reinforcing agent, or a combination thereof.

Aspect 10. An article comprising the thermoplastic composition.

Aspect 11. The article according to Aspect 10, wherein the article is a microwave absorber for an internal or external radar sensor.

Aspect 12. The article according to Aspect 10 or 11, wherein the article is a microwave absorber for a radar sensor, camera, or an electronic control unit.

Aspect 13. The article according to any of Aspects 10 to 12, wherein the article comprises a transmitting antenna, a receiving antenna, and at least two openings to allow transmission of microwave radiation between the transmitting antenna and the receiving antenna.

Aspect 14. A method for forming a thermoplastic composition, comprising, consisting of, or consisting essentially of:

combining a thermoplastic polymer component comprising a polyester with from about 0.01 wt % to about 1.95 wt % of a carbon nanotube (CNT) filler to form a mixture; and molding the mixture to form the thermoplastic composition, wherein a molded sample of the thermoplastic composition has a percent Absorbed Power measured in Transmission mode of at least 60% when observed at a 77 GHz frequency according to a Free Space method.

Aspect 15. The method according to Aspect 14, wherein molding the mixture comprises at least one of extruding, injection molding, rotational molding, blow molding or thermoforming the mixture to form the thermoplastic composition.

Aspect 16. A thermoplastic composition comprising, consisting of, or consisting essentially of:

a thermoplastic polymer component comprising a polyester; and from greater than 0.10 wt % to about 1.95 wt % of a carbon nanotube (CNT) filler, wherein a 6 inch (in)×8 in×⅛ in molded sample of the composition has a percent Absorbed Power measured in Transmission mode of at least 60% when observed at a 77 GHz frequency according to a Free Space method.

Aspect 17. The thermoplastic composition according to Aspect 16, wherein the polyester comprises polybutylene terephthalate (PBT), polyethylene terephthalate (PET), poly (cyclohexylenedimethylene terephthalate) (PCT), polyethylene terephthalate glycol (PETG), polycyclohexylene dimethylene terephthalate glycol (PCTG), polycyclohexylene dimethylene terephthalate acid (PCTA), polyethylene naphthalate (PEN), polybutylene naphthalate (PBN), copolymers thereof, or a combination thereof.

Aspect 18. The thermoplastic composition according to Aspect 16 or 17, wherein the composition comprises polybutylene terephthalate (PBT).

Aspect 19. The thermoplastic composition according to any of Aspects 16 to 18, wherein the CNT filler has an average diameter of about 5-15 nanometers (nm), a surface area of at least 100 square meters per gram (m$^2$/g), and a volume resistivity less than 10$^{-3}$ Ohm·centimeters (Ω·cm).

Aspect 20. The thermoplastic composition according to any of Aspects 16 to 19, wherein the composition has a volume electrical resistivity of at least 1.0×10$^{11}$ Ω·cm.

Aspect 21. The thermoplastic composition according to any of Aspects 16 to 20, wherein a 6 in×8 in×⅛ in molded sample of the composition has a percent Absorbed Power measured in Transmission mode of at least 60% when observed at frequencies of from 75 GHz to 110 GHz according to a Free Space method.

Aspect 22. The thermoplastic composition according to any of Aspects 16 to 21, wherein the composition comprises from greater than 0.25 wt % to less than 1 wt % of the CNT filler, wherein a 6 in×8 in×⅛ in molded sample of the composition has a Percent Absorbed Power measured in Transmission mode of at least 74% when observed at a 77 GHz frequency according to a Free Space method.

Aspect 23. The thermoplastic composition according to any of Aspects 16 to 22, wherein the composition further comprises a polycarbonate-siloxane copolymer.

Aspect 24. The thermoplastic composition according to any of Aspects 16 to 21, wherein the composition comprises from greater than 0.25 wt % to about 1.95 wt % of the CNT filler, and wherein a molded sample of the composition has an attenuation constant of at least −30 dB/cm when observed at a 77 GHz frequency according to a free space method.

Aspect 25. The thermoplastic composition according to any of Aspects 16 to 24, wherein the composition further comprises at least one additional additive, wherein the at least one additional additive comprises an acid scavenger, an anti-drip agent, an antioxidant, an antistatic agent, a colorant, a de-molding agent, a flow promoter, a lubricant, a mold release agent, a plasticizer, a quenching agent, a flame retardant, a UV reflecting additive, an impact modifier, a blowing agent, a reinforcing agent, or a combination thereof.

Aspect 26. An article comprising the thermoplastic composition according to any of Aspects 16 to 25.

Aspect 27. The article according to Aspect 26, wherein the article is a microwave absorber for an internal or external radar sensor.

Aspect 28. The article according to Aspect 26, wherein the article is a microwave absorber for a radar sensor, camera, or an electronic control unit.

Aspect 29. The article according to any of Aspects 26 to 28, wherein the article comprises a transmitting antenna, a receiving antenna, and at least two openings to allow transmission of microwave radiation between the transmitting antenna and the receiving antenna.

Aspect 30. A method for forming a thermoplastic composition, comprising, consisting of, or consisting essentially of:

combining a thermoplastic polymer component comprising a polyester with from greater than 0.10 wt % to about 1.95 wt % of a carbon nanotube (CNT) filler to form a mixture; and molding the mixture to form the thermoplastic composition, wherein a 6 in×8 in×⅛ in molded sample of the thermoplastic composition has a percent Absorbed Power measured in Transmission mode of at least 60% when observed at a 77 GHz frequency according to a Free Space method.

Aspect 31. The method according to Aspect 30, wherein molding the mixture comprises at least one of extruding, injection molding, rotational molding, blow molding or thermoforming the mixture to form the thermoplastic composition.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %.

There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

Figures 7, 8:
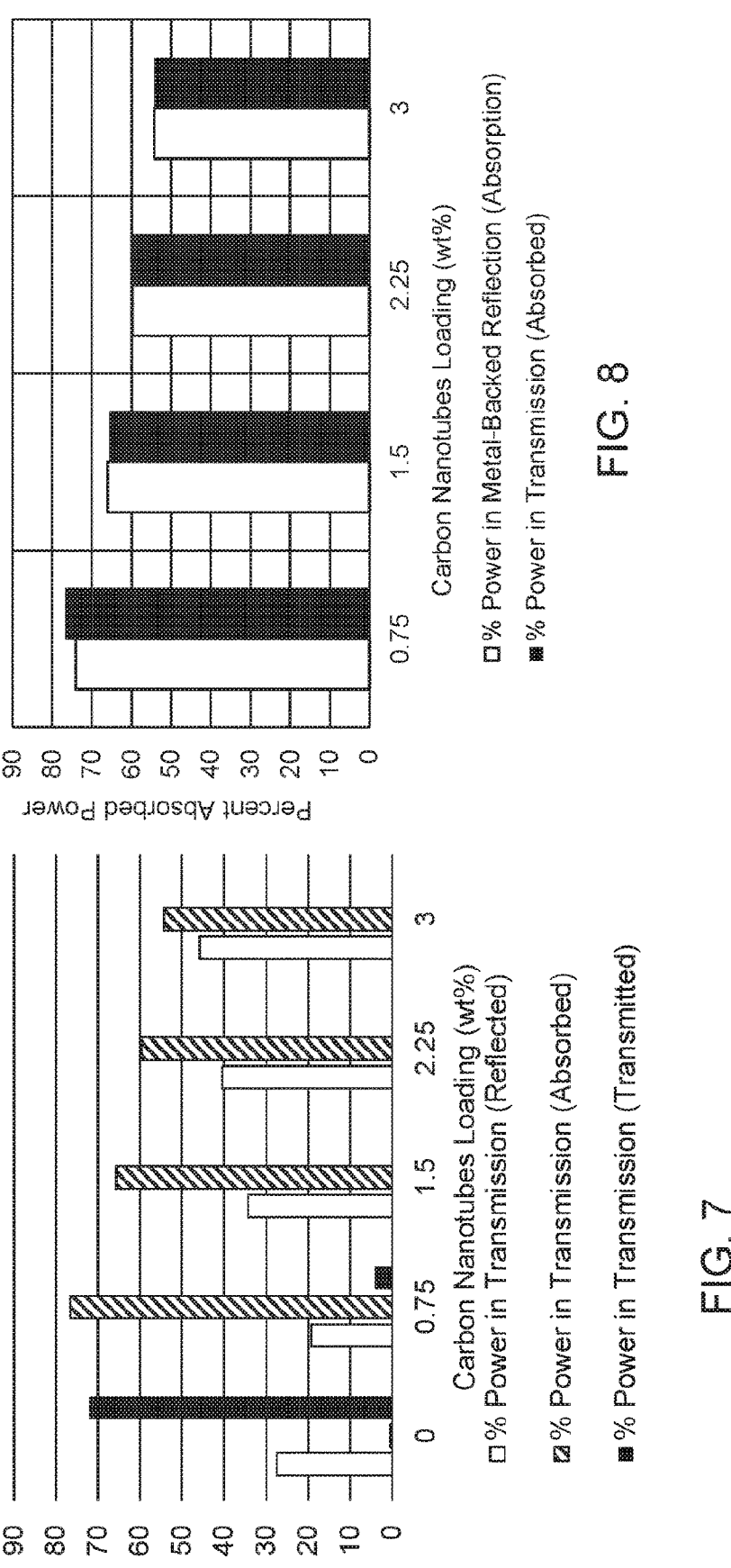
FIG. 7 is a graph illustrating percent power in transmission mode as a function of CNT loading observed at a 77 GHz frequency for example and comparative compositions according to aspects of the disclosure.
FIG. 8 is a graph illustrating percent absorbed power in Transmission and Metal-backed Reflection modes as a function of CNT loading for example and comparative compositions according to aspects of the disclosure.

The PBT-MWCNT masterbatch used in the compositions described herein was diluted with different amounts of fresh, unfilled Ultradur® B4500 (BASF), a medium-viscosity PBT grade suitable for use in manufacturing thin-walled profiles and pipes. This grade is also suitable for the manufacture of industrial functional parts in injection molding applications. The amount of masterbatch in the compositions varied from 20 to 5 weight percent, and the amount of fresh PBT resin was varied from 80 to 95 weight percent. These polymer/masterbatch ratios produced materials containing from about 3 weight % to about 0.75 weight % of carbon nanotubes in the final formulation. Example and comparative compositions were prepared and various properties determined as set forth in Table 1:

increased from about 12 dB to about 60 dB when the CNT loading in the formulation increased. FIG. 7 shows that the percent reflected power measured in transmission mode increased with the CNT loading, whereas the percent transmitted power and percent absorbed power measured in transmission mode both decreased when the CNT loading was increased. As these results show for a frequency of 77 GHz, the Percent Reflected Power measured in Transmission mode increased from about 19% at 0.75 wt % of nanotubes to about 46% at 3 wt % of nanotubes. Similarly, the Percent Transmitted Power measured in Transmission mode decreased from about 4% at 0.75 wt % of nanotubes to virtually non-measurable at a concentration of 3 wt % of nanotubes. The Percent Absorbed Power measured in Transmission mode decreased monotonically from about 77% at 0.75 wt % of nanotubes to about 54% at 3 wt % of nanotubes. These results may be explained in terms of the electrical resistivities observed for these materials, as the increase in the amount of conductive filler would render these materials more electrically conductive thus behaving dielectrically more like metals, which are less absorbing, less transmitting and more reflecting of microwave radiation when compared with polymer-based materials.

TABLE 1

Example and Comparative Compositions and Properties

| Component (wt %) | CEx1 | Ex1 | Ex2 | CEx2 | CEx3 |
|---|---|---|---|---|---|
| MB (Nanocyl MB) | 0 | 5 | 10 | 15 | 20 |
| MWCNTs in MB | — | 15 | 15 | 15 | 15 |
| PBT in MB | — | 85 | 85 | 85 | 85 |
| Ultradur ® B4500 (PBT) | — | 95 | 90 | 85 | 80 |
| Total PBT | 100* | 99.25 | 98.5 | 97.75 | 97 |
| Total CNT | 0 | 0.75 | 1.5 | 2.25 | 3 |
| Properties | | | | | |
| | | | | | |
| Frequency (Hz) | 6.70E+10 | 7.70E+10 | 7.70E+10 | 7.70E+10 | 7.70E+10 |
| $\varepsilon'$ | 3.220 | 6.161 | 10.843 | 15.513 | 20.163 |
| $\varepsilon''$ | 0.0023 | 1.389 | 3.963 | 6.931 | 10.480 |
| $\varepsilon''/\varepsilon'$ (tan $\delta$) | 0.0007 | 0.225 | 0.365 | 0.447 | 0.520 |
| Attenuation Constant (dB/cm) | | −38.941 | −82.948 | −120.404 | −158.480 |
| Total Shielding Effectiveness (dB) | | 13.860 | 28.776 | 41.287 | 53.865 |
| RL Measured (Metal-Backed, Frontside) (dB) | | −5.857 | −4.682 | −3.954 | −3.395 |
| RL Calculated (Metal-Backed) (dB) | | −6.338 | −5.176 | −4.191 | −3.581 |
| % Power in Metal-Backed Reflection (Absorption) | | 74.04 | 65.98 | 59.77 | 54.24 |
| % Power in Transmission (Reflected) | 27.52 | 19.23 | 34.30 | 40.37 | 45.76 |
| % Power in Transmission (Absorbed) | 0.41 | 76.66 | 65.57 | 59.62 | 54.24 |
| % Power in Transmission (Transmitted) | 72.07 | 4.11 | 0.13 | 0.01 | 0.00 |
| Surface Resistivity (Ohm/sq) (Avg) | | 8.53E+13 | 4.74E+13 | 5.33E+10 | 3.72E+06 |
| Volume Resistivity (Ohm · cm) (Avg) | | 7.13E+14 | 1.12E+14 | 5.52E+10 | 7.11E+07 |

*PBT in CEx1 was Valox 325

Graphical illustrations of the data set forth above are provided in FIGS. 3-23.

Figure 10:
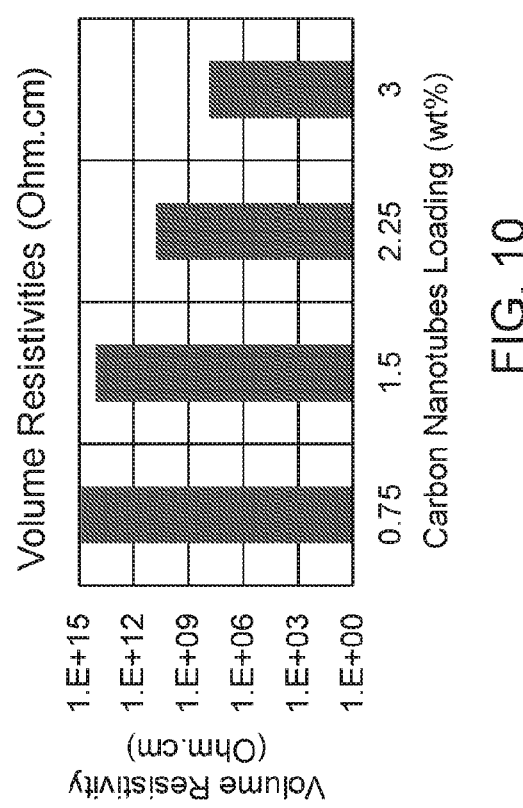
FIG. 10 is a graph illustrating volume resistivity as a function of CNT loading for example and comparative compositions according to aspects of the disclosure.
Figure 9:
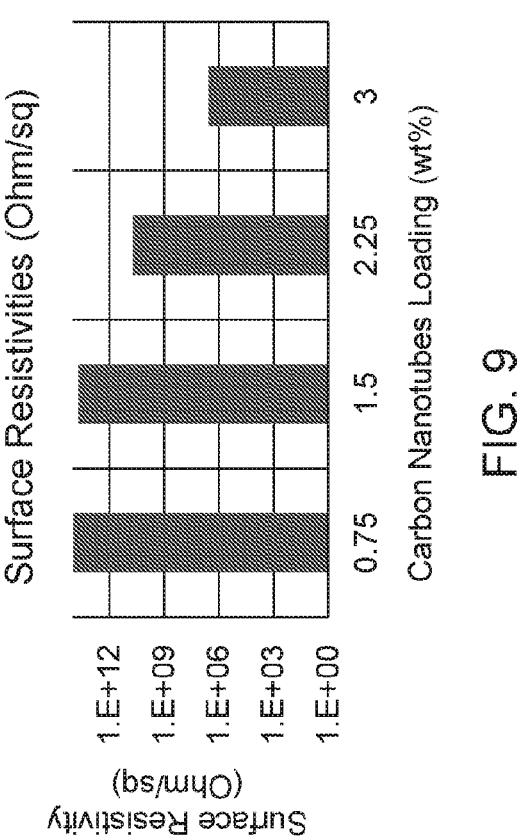
FIG. 9 is a graph illustrating surface resistivity as a function of CNT loading for example and comparative compositions according to aspects of the disclosure.
Figures 11, 12, 13:
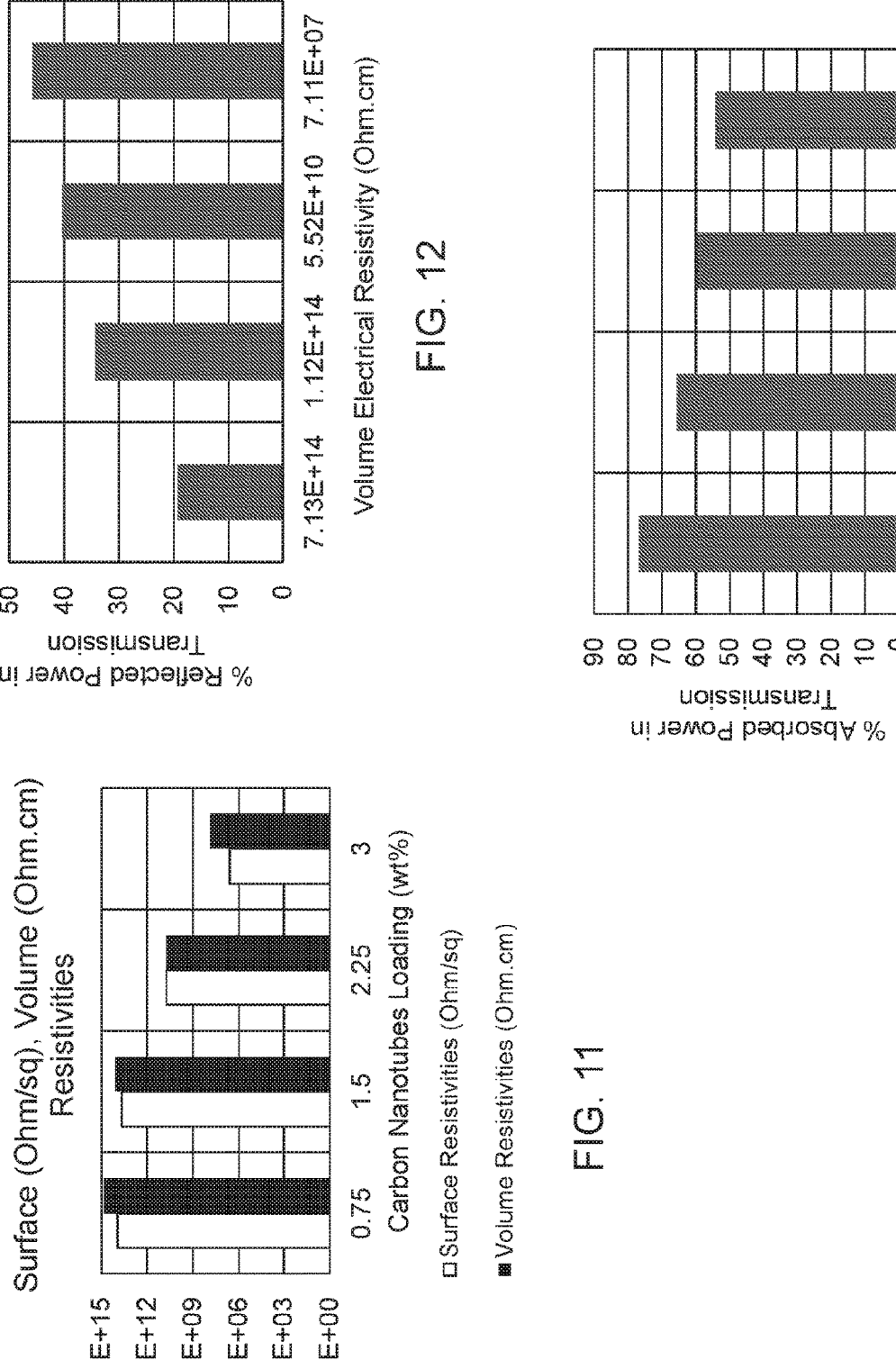
FIG. 11 is a graph illustrating surface and volume resistivities as a function of CNT loading for example and comparative compositions according to aspects of the disclosure.
FIG. 12 is a graph illustrating percent reflected power in transmission mode observed at a 77 GHz frequency as a function of volume electrical resistivity for example and comparative compositions according to aspects of the disclosure.
FIG. 13 is a graph illustrating percent absorbed power in transmission mode observed at a 77 GHz frequency as a function of volume electrical resistivity for example and comparative compositions according to aspects of the disclosure.

FIG. 3 shows that the real and imaginary parts of the complex dielectric permittivity both increased with the CNT loading in the formulation. FIG. 4 shows the same trend for the dissipation factor ($\varepsilon''/\varepsilon'$) or tan $\delta$ observed in these formulations. FIG. 5 shows that the Attenuation Constant increased from about −35 dB/cm to about −160 dB/cm, and FIG. 6 shows that the Total Shielding Effectiveness FIG. 8 shows that the percent absorbed power at a 77 GHz measured in both transmission mode and metal-backed reflection mode are similar for all the CNT loadings investigated. This result could be explained in terms of the low microwave transmission observed in these compositions, which would make the material under test behave almost as a metal plate located between the sample and the receiving antenna. FIGS. 9 and 10 show how the electrical surface and volume resistivities, respectively, decreased with the amount of CNT filler added to the formulation. It is also worth mentioning how a relatively small amount of CNT conductive filler renders these compositions virtually opaque (non-transmitting) to 77 GHz microwave radiation while only marginally affecting the electrical resistivity of the base polymer. FIG. 11 shows a back-to-back comparison of the surface and volume electrical resistivities of the compositions of this disclosure in terms of CNT loading. The similar results observed for both electrical resistivities suggest that a relatively uniform distribution of the conductive fibrils in the polymeric matrix has been obtained in the compounding step to prepare these materials. FIGS. 12 and 13 show how the percent reflected power in transmission mode increased and the percent absorbed power in transmission mode decreased as the CNT loading increased rendering these compositions more electrically conductive (lower volume resistivities).

Figure 14:
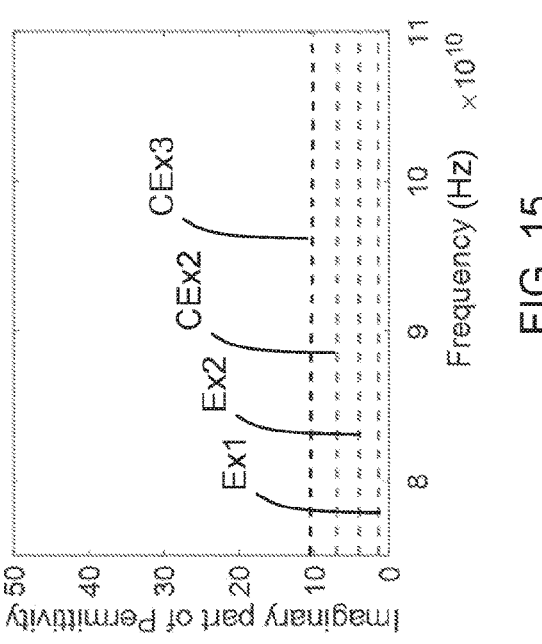
FIG. 14 is a graph illustrating the real part of the complex dielectric permittivity as a function of frequency in the W-band (75-110 GHz) for example and comparative compositions according to aspects of the disclosure.
Figure 15:
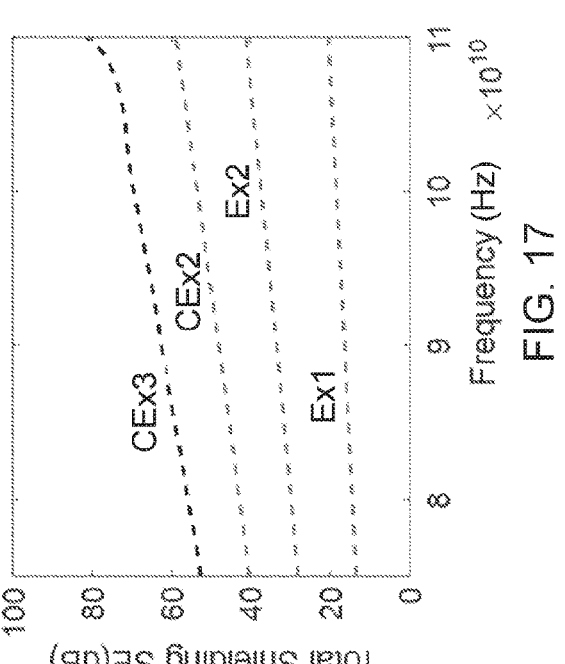
FIG. 15 is a graph illustrating the imaginary part of the complex dielectric permittivity as a function of frequency in the W-band (75-110 GHz) for example and comparative compositions according to aspects of the disclosure.
Figure 16:
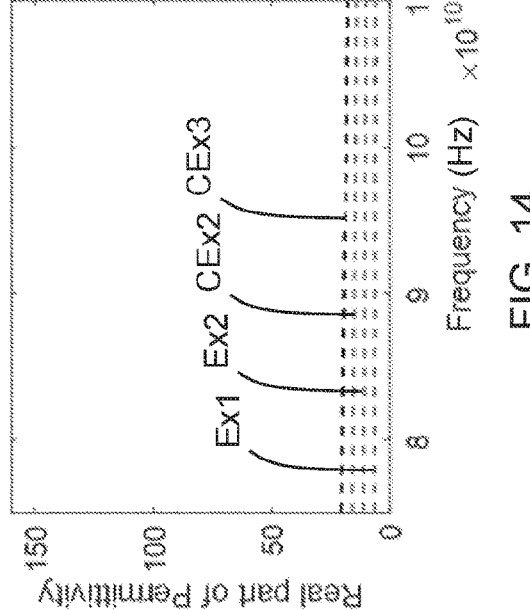
FIG. 16 is a graph illustrating attenuation as a function of frequency in the W-band (75-110 GHz) for example and comparative compositions according to aspects of the disclosure.
Figure 17:
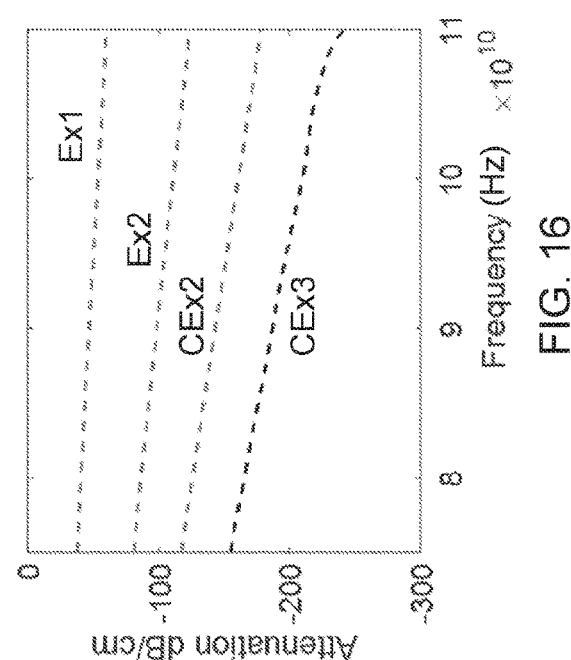
FIG. 17 is a graph illustrating total shielding effectiveness as a function of frequency in the W-band (75-110 GHz) for example and comparative compositions according to aspects of the disclosure.
Figures 18, 19:
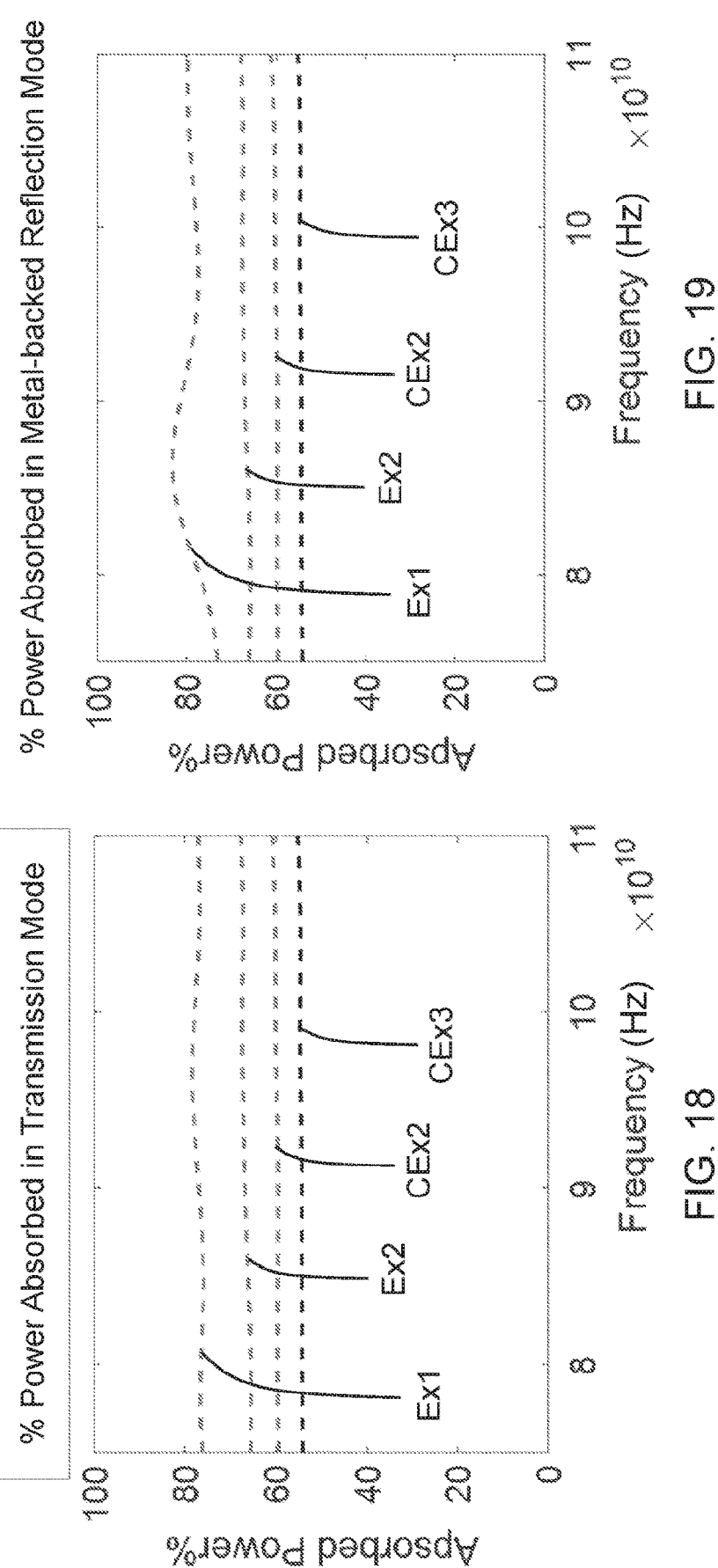
FIG. 18 is a graph illustrating percent absorbed power measured in transmission mode as a function of frequency in the W-band (75-110 GHz) for example and comparative compositions according to aspects of the disclosure.
FIG. 19 is a graph illustrating percent absorbed power measured in metal-backed reflection mode as a function of frequency in the W-band (75-110 GHz) for example and comparative compositions according to aspects of the disclosure.

FIGS. 14 and 15 show the real part and imaginary part, respectively, of the complex dielectric permittivity for the entire range of frequencies (75-110 GHz) in the W-band. As both graphs show, the complex permittivities of the compositions of this disclosure are virtually independent of frequency in the frequency range investigated. FIGS. 16 and 17 describe the attenuation constant and total shielding effectiveness, respectively, for the entire range (75-110 GHz) of frequencies investigated. FIGS. 18 and 19 show the percent absorbed power in transmission mode and metal-backed reflection mode, respectively, for the entire range (75-110 GHz) of frequencies investigated. FIGS. 20, 21, 22 and 23 show the percent absorbed, reflected and transmitted power measured in transmission mode for all frequencies of the W-band (75-110 GHz) of Ex1, Ex2, CEx2, and CEx3, respectively, described in this disclosure.

From measurements of ε' and ε" observed at 67 GHz on a 3.132 mm thick plaque of pure VALOX/PBT with no filler, the calculated Percent Transmitted Power, Percent Reflected Power, and Percent Absorbed Power of the pure resin at 67 GHz were 72%, 27.5% and 0.4%, respectively. From these results, it can be speculated that the highest Percent Absorbed Power measured in Transmission mode of the example compositions of this disclosure will occur either at 0.75 wt % of carbon nanotubes, or less. The most suitable compositions absorb 77 GHz microwave radiation of 60% or higher, or even more suitably 65% or higher.

Additional comparative and example compositions were prepared and tested as shown in Tables 2A and 22:

TABLE 2A

| Example and Comparative Compositions and Properties | | | | |
|---|---|---|---|---|
| Item Description | C2.1 | C2.2 | Ex2.3 | Ex2.4 |
| PBT (Valox ™ 195) | 30.32 | 30.12 | 29.54 | 28.56 |
| PBT (Valox ™ 315) | 21.54 | 21.4 | 20.98 | 20.29 |
| MB (Nanocyl MB) | 0.33 | 0.67 | 1.67 | 3.34 |
| Impact modifier (IM) (Ethylene-ethylacrylate Copolymer) | 2 | 2 | 2 | 2 |
| IM (Polybutylene tere/iso phthalate-co-polyoxybutylene) | 2.5 | 2.5 | 2.5 | 2.5 |
| IM (Ethylene-Methylacrylate-Glycidylmethacrylate Copolymer) | 3 | 3 | 3 | 3 |
| PC-Si Copolymer (EXL, 20 wt % siloxane) | 20 | 20 | 20 | 20 |
| Stabilizer (ST) mono zinc phosphate | 0.05 | 0.05 | 0.05 | 0.05 |
| ST Antioxidant 1010 | 0.06 | 0.06 | 0.06 | 0.06 |
| Mold release Pentaerythritol Tetrastearate (PETS) | 0.2 | 0.2 | 0.2 | 0.2 |
| Glass fiber (flat) | 20 | 20 | 20 | 20 |
| Total: | 100 | 100 | 100 | 100 |
| Total CNTs (MB content * 0.15) | 0.05 | 0.10 | 0.25 | 0.50 |
| Properties | | | | |
| Mechanical | | | | |
| Notched Izod Impact (NII), 23° C., ASTM D256, ASTM D4812, Joule per meter (J/m) | 154 | 151 | 151 | 146 |
| Unnotched Izod Impact (UNI), 23° C., ASTM D256, ASTM D4812, J/m | 636 | 794 | 794 | 773 |
| NII, −30° C., ASTM D256, ASTM D4812, J/m | 104 | 89.3 | 111 | 107 |
| UNI, −30° C., ASTM D256, ASTM D4812, J/m | 841 | 859 | 842 | 830 |
| Dielectric | | | | |
| Frequency (Hz) | 7.70E+10 | 7.70E+10 | 7.70E+10 | 7.70E+10 |
| ε' | 3.409 | 3.721 | 4.728 | 6.038 |
| ε" | 0.124 | 0.234 | 0.668 | 1.538 |
| ε"/ε' (tan δ) | 0.036 | 0.063 | 0.141 | 0.255 |
| Attenuation Constant (dB/cm) | −4.703 | −8.498 | −21.463 | −43.483 |
| Total Shielding Effectiveness (dB) | 1.950 | 3.123 | 8.171 | 15.001 |
| RL Measured (Metal-Backed, Frontside) (dB) | −1.523 | −7.960 | −7.554 | −7.322 |
| RL Calculated (Metal-Backed) (dB) | −1.948 | −2.699 | −14.002 | −6.706 |
| % Power in Metal-Backed Reflection (Absorption) | 29.59 | 84.01 | 82.44 | 81.47 |
| % Power in Transmission (Reflected) | 8.67 | 3.83 | 19.86 | 18.38 |
| % Power in Transmission (Absorbed) | 27.51 | 47.46 | 64.91 | 78.46 |
| % Power in Transmission (Transmitted) | 63.82 | 48.72 | 15.24 | 3.16 |
| Surface resistivity, ASTM D257, Ohm/square | 9.90E+12 | 8.14E+12 | 2.36E+13 | 2.38E+13 |

TABLE 2A-continued

| Example and Comparative Compositions and Properties | | | | |
|---|---|---|---|---|
| Item Description | C2.1 | C2.2 | Ex2.3 | Ex2.4 |
| Volume resistivity, ASTM D257, 3.2 mm, Ohm-cm | 2.90E+14 | 3.20E+14 | 8.42E+14 | 8.29E+14 |

TABLE 2B

| Example and Comparative Compositions and Properties | | | | |
|---|---|---|---|---|
| Item Description | Ex2.5 | Ex2.6 | Ex2.7 | C2.8 |
| PBT (Valox ™ 195) | 27.59 | 26.61 | 24.66 | 18.8 |
| PBT (Valox ™ 315) | 19.59 | 18.9 | 17.51 | 13.35 |
| MB (Nanocyl MB) | 5.01 | 6.68 | 10.02 | 20.04 |
| Impact modifier (IM) (Ethylene-ethylacrylate Copolymer) | 2 | 2 | 2 | 2 |
| IM (Polybutylene tere/iso phthalate-co-polyoxybutylene) | 2.5 | 2.5 | 2.5 | 2.5 |
| IM (Ethylene-Methylacry late-Glycidylmethacrylate Copolymer) | 3 | 3 | 3 | 3 |
| PC-Si Copolymer (EXL, 20 wt % siloxane) | 20 | 20 | 20 | 20 |
| Stabilizer (ST) mono zinc phosphate | 0.05 | 0.05 | 0.05 | 0.05 |
| ST Antioxidant 1010 | 0.06 | 0.06 | 0.06 | 0.06 |
| Mold release Pentaerythritol Tetrastearate (PETS) | 0.2 | 0.2 | 0.2 | 0.2 |
| Glass fiber (flat) | 20 | 20 | 20 | 20 |
| Total: | 100 | 100 | 100 | 100 |
| Total CNTs (MB content * 0.15) | 0.75 | 1.00 | 1.50 | 3.00 |
| Properties | | | | |
| Mechanical | | | | |
| Notched Izod Impact (NII), 23° C., ASTM D256, ASTM D4812, Joule per meter (J/m) | 147 | 147 | 147 | 130 |
| Unnotched Izod Impact (UNI), 23° C., ASTM D256, ASTM D4812, J/m | 777 | 770 | 765 | 814 |
| NII, –30° C., ASTM D256, ASTM D4812, J/m | 108 | 107 | 102 | 91.8 |
| UNI, –30° C., ASTM D256, ASTM D4812, J/m | 790 | 905 | 839 | 845 |
| Dielectric | | | | |
| Frequency (Hz) | 7.70E+10 | 7.70E+10 | 7.70E+10 | 7.70E+10 |
| $\varepsilon'$ | 7.422 | 8.702 | 11.178 | 19.508 |
| $\varepsilon''$ | 2.382 | 3.507 | 5.513 | 9.959 |
| $\varepsilon''/\varepsilon'$ (tan δ) | 0.321 | 0.403 | 0.493 | 0.511 |
| Attenuation Constant (dB/cm) | –60.486 | –81.673 | –112.285 | –153.268 |
| Total Shielding Effectiveness (dB) | 20.595 | 27.385 | 38.269 | 51.629 |
| RL Measured (Metal-Backed, Frontside) (dB) | –6.110 | –5.751 | –5.105 | –3.809 |
| RL Calculated (Metal-Backed) (dB) | –6.452 | –5.763 | –4.900 | –3.652 |
| % Power in Metal-Backed Reflection (Absorption) | 75.51 | 73.40 | 69.14 | 58.40 |
| % Power in Transmission (Reflected) | 24.48 | 27.18 | 31.02 | 42.03 |
| % Power in Transmission (Absorbed) | 74.64 | 72.63 | 68.96 | 57.97 |
| % Power in Transmission (Transmitted) | 0.87 | 0.18 | 0.01 | 0.00 |
| Surface resistivity, ASTM D257, Ohm/square | 1.03E+14 | 5.80E+13 | 5.44E+09 | 1.42E+06 |
| Volume resistivity, ASTM D257, 3.2 mm, Ohm-cm | 7.91E+14 | 3.38E+14 | 2.14E+11 | 1.76E+07 |

The compositions of Tables 2A and Table 2B were tested to evaluate the CNT content that would produce maximum microwave absorption at 77 GHz. The compositions of Table 1 demonstrate that maximum microwave absorption at 77 GHz would occur at 0.75 wt % CNT or lower. Table 2A shows that composition Ex2.4 containing only 0.5 wt % CNTs had a MW absorption at 77 GHz of 78.46%.

Figure 24:
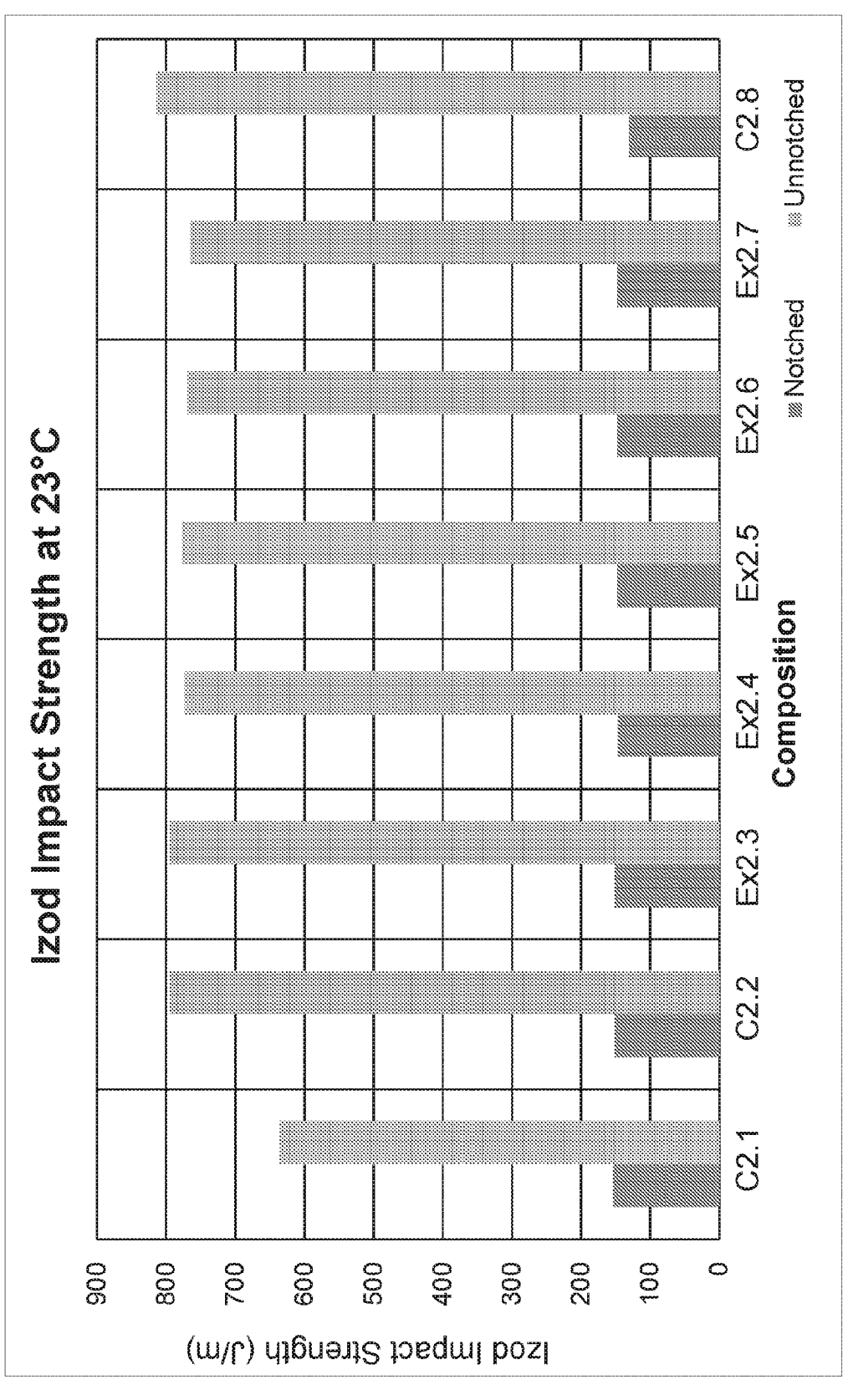
FIG. 24 is a graph illustrating notched and unnotched Izod impact strength at 23° C. for example and comparative compositions according to aspects of the disclosure.
Figure 25:
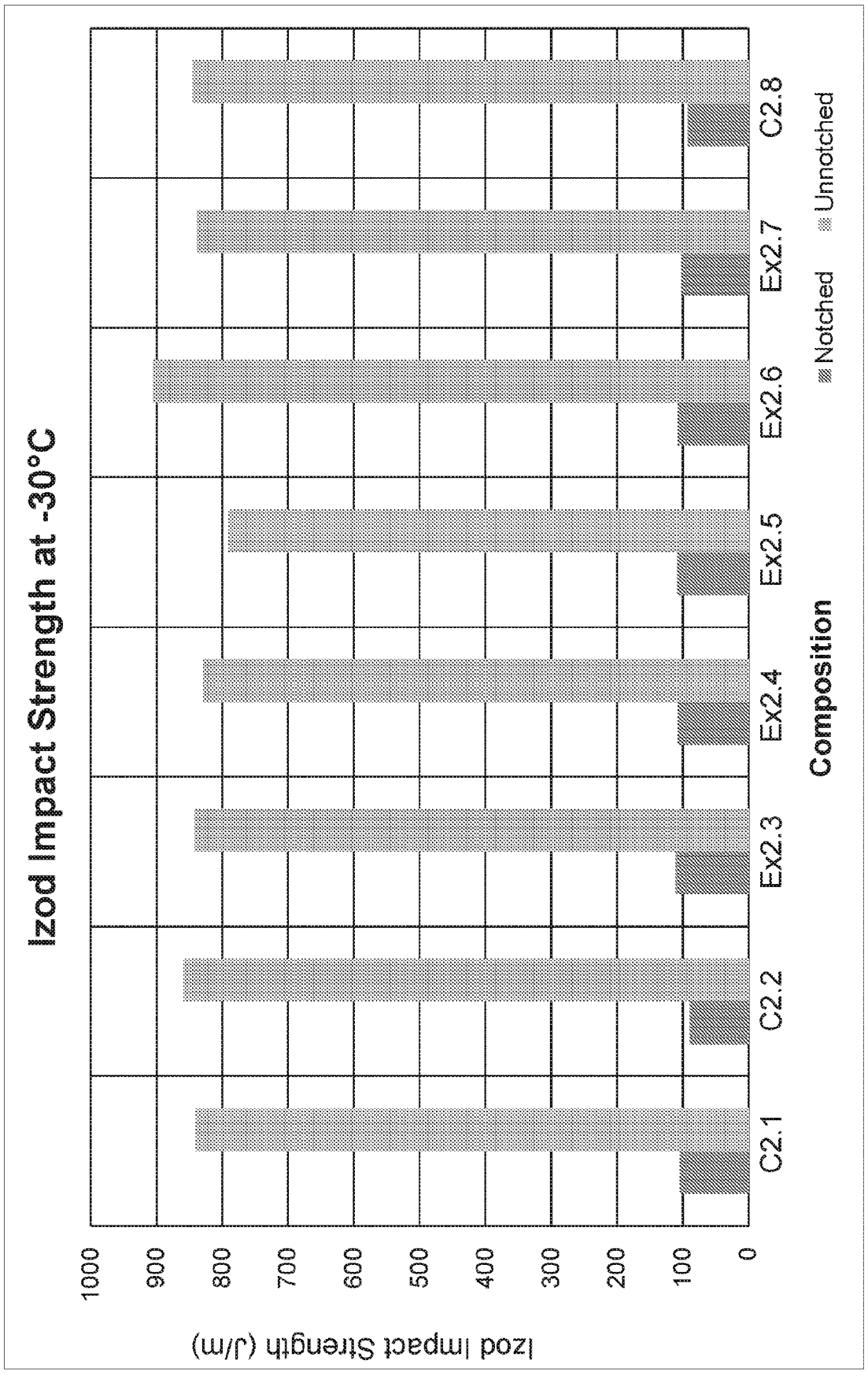
FIG. 25 is a graph illustrating notched and unnotched Izod impact strength at −30° C. for example and comparative compositions according to aspects of the disclosure.

Graphs of impact properties of the Table 2 compositions are illustrated in FIGS. 24 and 25. At 23° C. compositions Ex2.3-Ex2.7 all had a NII of at least 146 J/m in contrast to comparative composition C2.3 which had a NII of 130 J/m. Accordingly compositions according to aspects of the disclosure may have a NII at 23° C. as tested in accordance with ASTM D256 and ASTM D4812 of greater than 130 J/m, or at least 135 J/m, or at least 140 J/m, or at least 145 J/m, or from greater than 130 J/m to 180 J/m, or from 135 J/m to 180 J/m, or from 140 J/m to 180 J/m, or from 145 J/m to 180 J/m.

Similarly, compositions Ex2.3-Ex2.7 according to aspects of the disclosure had improved low temperature (–30° C.) impact properties as compared to comparative composition C2.3. Compositions according to aspects of the disclosure may thus have a NII at –30° C. as tested in accordance with ASTM D256 and ASTM D4812 of at least 90 J/m, or at least 92 J/m, or at least 95 J/m, or at least 100 J/m, or at least 102 J/m, or from 90 J/m to 150 J/m, or from 92 J/m to 150 J/m, or from 95 J/m to 150 J/m, or from 100 J/m to 150 J/m, or from 102 J/m to 150 J/m.

Figure 28:
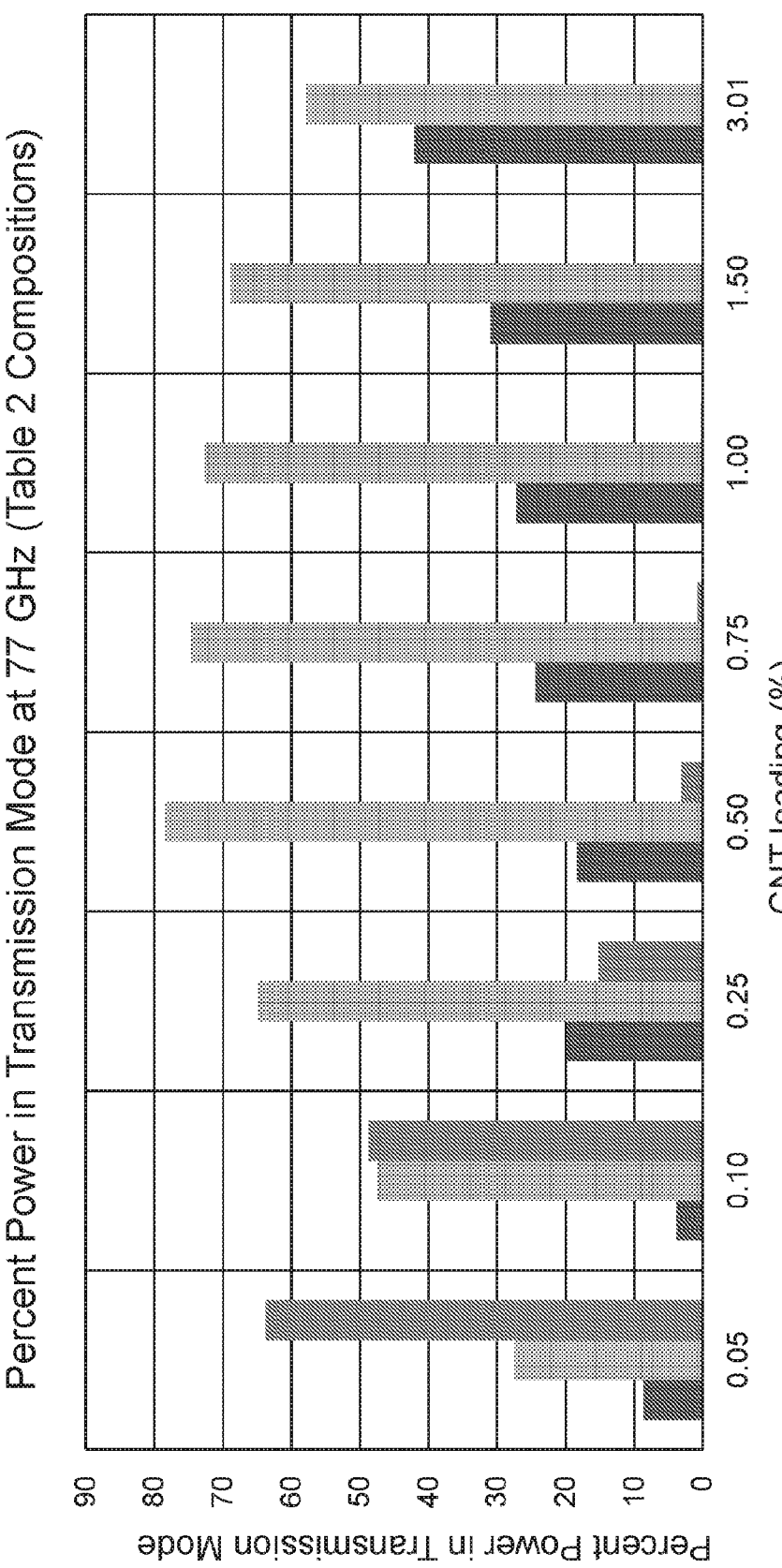
FIG. 28 is a graph illustrating percent power in transmission mode as a function of CNT loading observed at a 77 GHz frequency for example and comparative compositions according to aspects of the disclosure.

Graphs of dielectric properties of the Table 2 compositions at 77 GHz are shown in FIGS. 26-28. FIG. 26 showed that the real and imaginary parts of the complex dielectric permittivity both increased when the concentration of carbon nanotubes in the composition increased from 0.05 wt % to 3 wt %. Since the imaginary part of the complex dielectric permittivity increased more rapidly than the real part of the complex dielectric permittivity when the concentration of carbon nanotubes in the composition increased, the dissipation factor (Df), or the ratio of the imaginary to the real permittivity (e"/e'), also increased when the concentration of carbon nanotubes in the composition increased (FIG. 27). The average thicknesses of the 6 in×8 in×⅛ in plaques molded from the C2.1, C2.2, Ex2.3-Ex2.7 and C2.8 compositions were 2.983 mm, 3.10 mm, 3.092 mm, 3.086 mm, 3.054 mm, 3.051 mm, 3.126 mm and 3.065 mm, respectively.

Similarly, the Percent Reflected Power measured in Transmission Mode increased from about 9% to about 42%, and the Percent Transmitted Power measured in Transmission Mode decreased continuously from about 64% to virtually no transmission when the concentration of carbon nanotubes in the composition increased from 0.05 wt % to 3%. The Percent Absorbed Power measured in Transmission Mode showed a surprising behavior: it first increased continuously from about 27.5% at 0.05 wt % CNTs to about 78.5% at 0.5 wt % CNTs, and then decreased continuously to about 58% at 3 wt % CNTs in the formulation. These results suggest that the maximum microwave absorption at 77 GHz occurs when the concentration of carbon nanotubes in the composition is around 0.5 wt % (FIG. 28).

Figure 29:
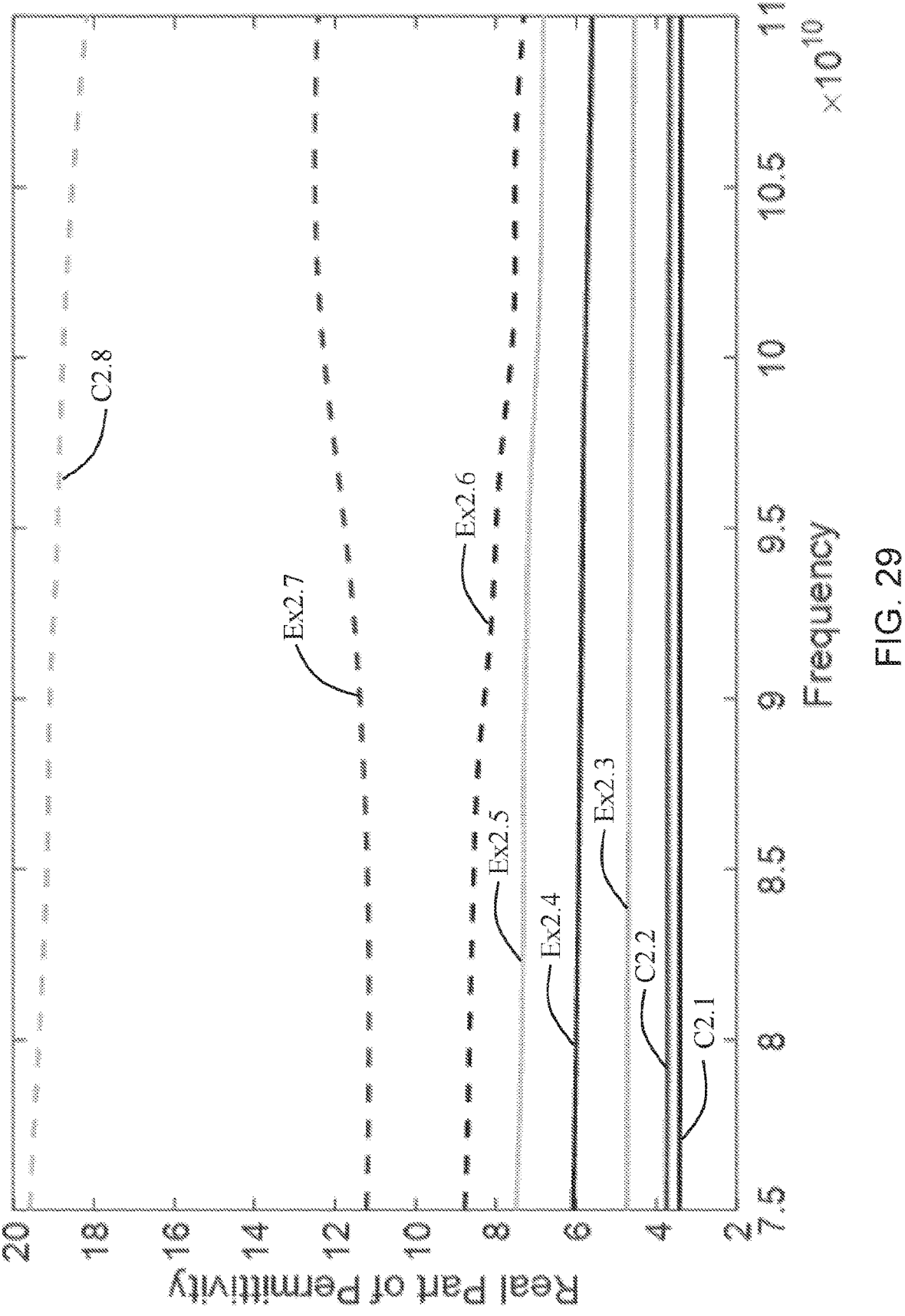
FIG. 29 is a graph illustrating the real part of the complex dielectric permittivity as a function of frequency in the W-band (75-110 GHz) for example and comparative compositions according to aspects of the disclosure.
Figure 30:
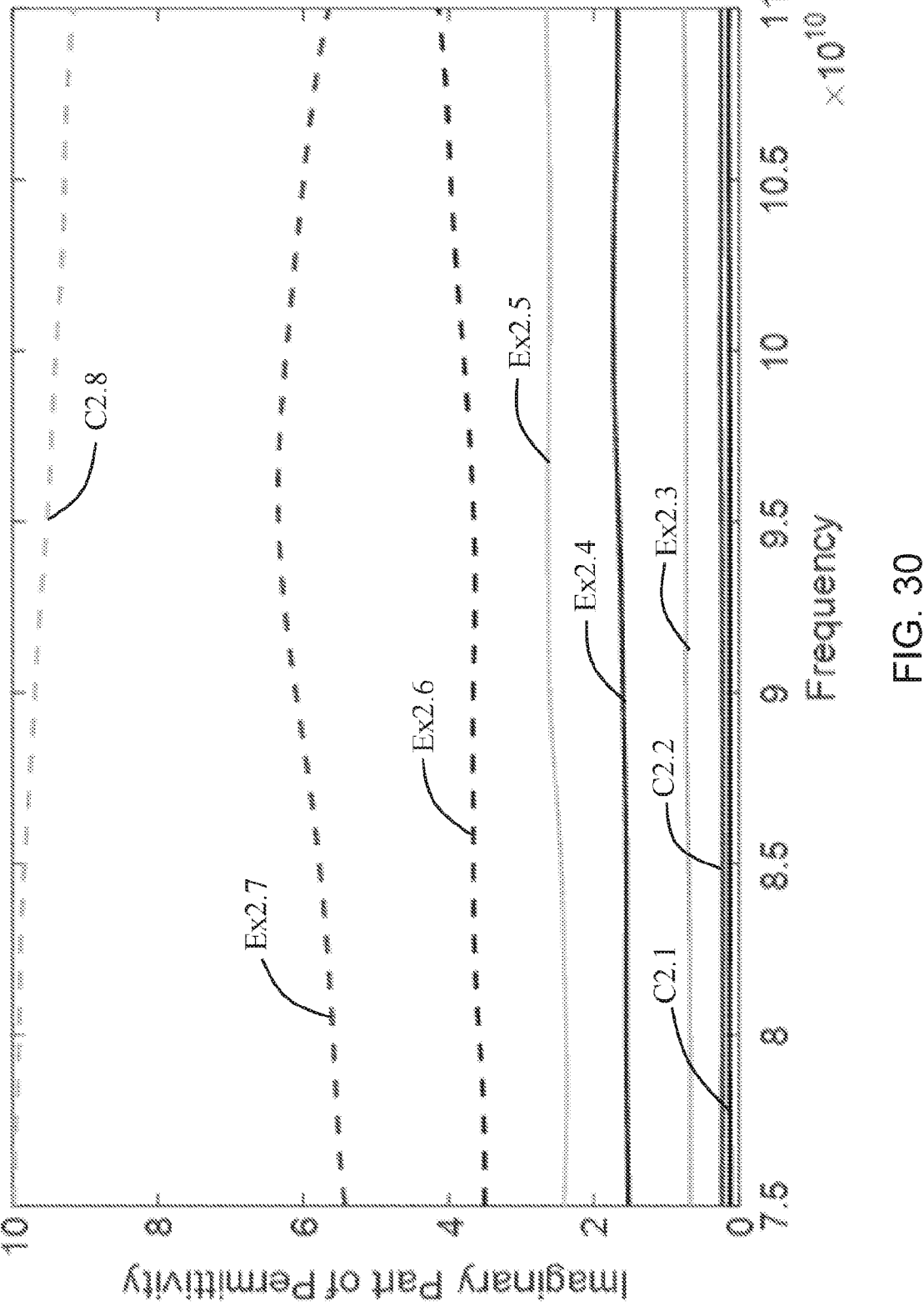
FIG. 30 is a graph illustrating the imaginary part of the complex dielectric permittivity as a function of frequency in the W-band (75-110 GHz) for example and comparative compositions according to aspects of the disclosure.
Figure 31:
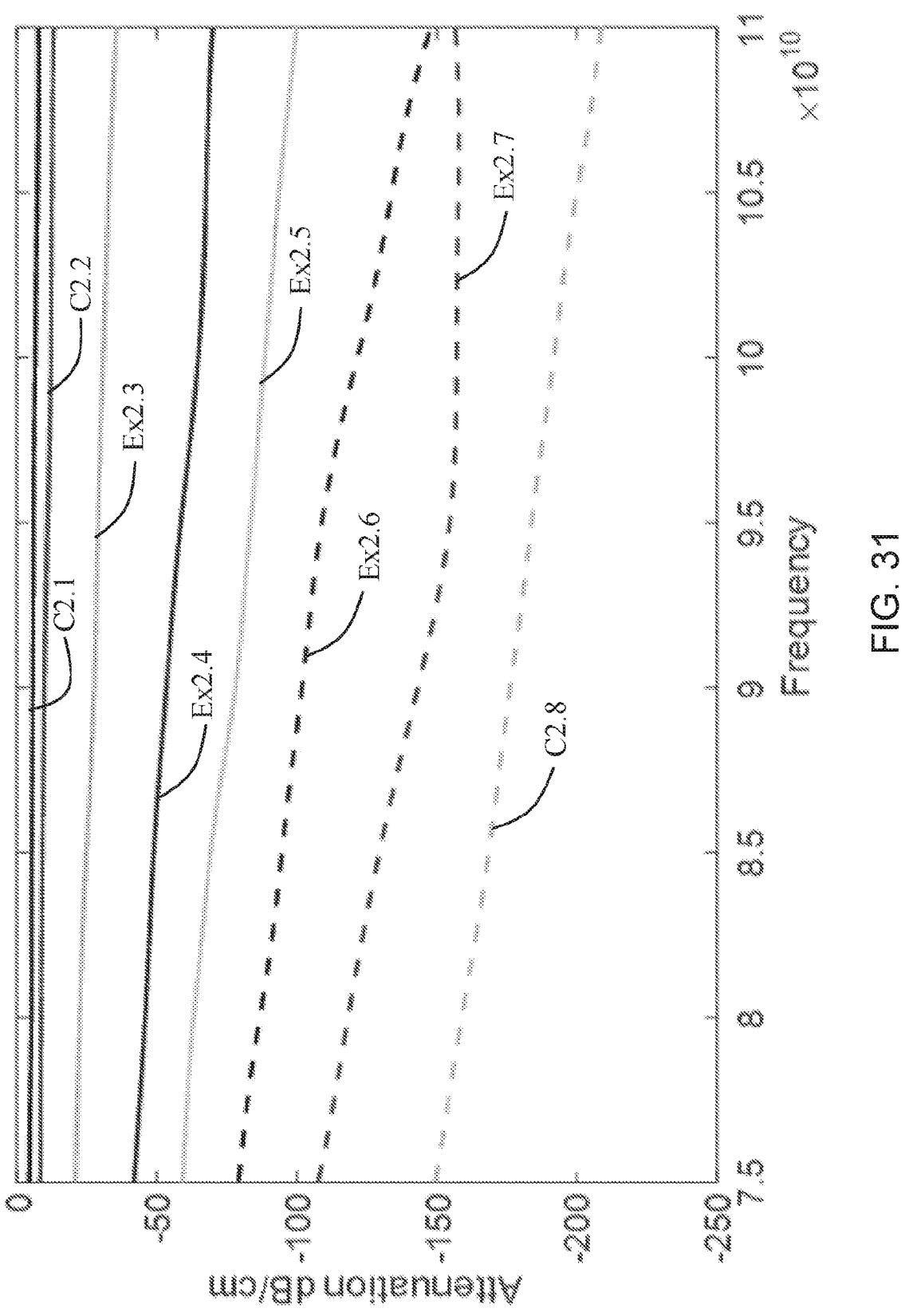
FIG. 31 is a graph illustrating attenuation as a function of frequency in the W-band (75-110 GHz) for example and comparative compositions according to aspects of the disclosure.
Figure 32:
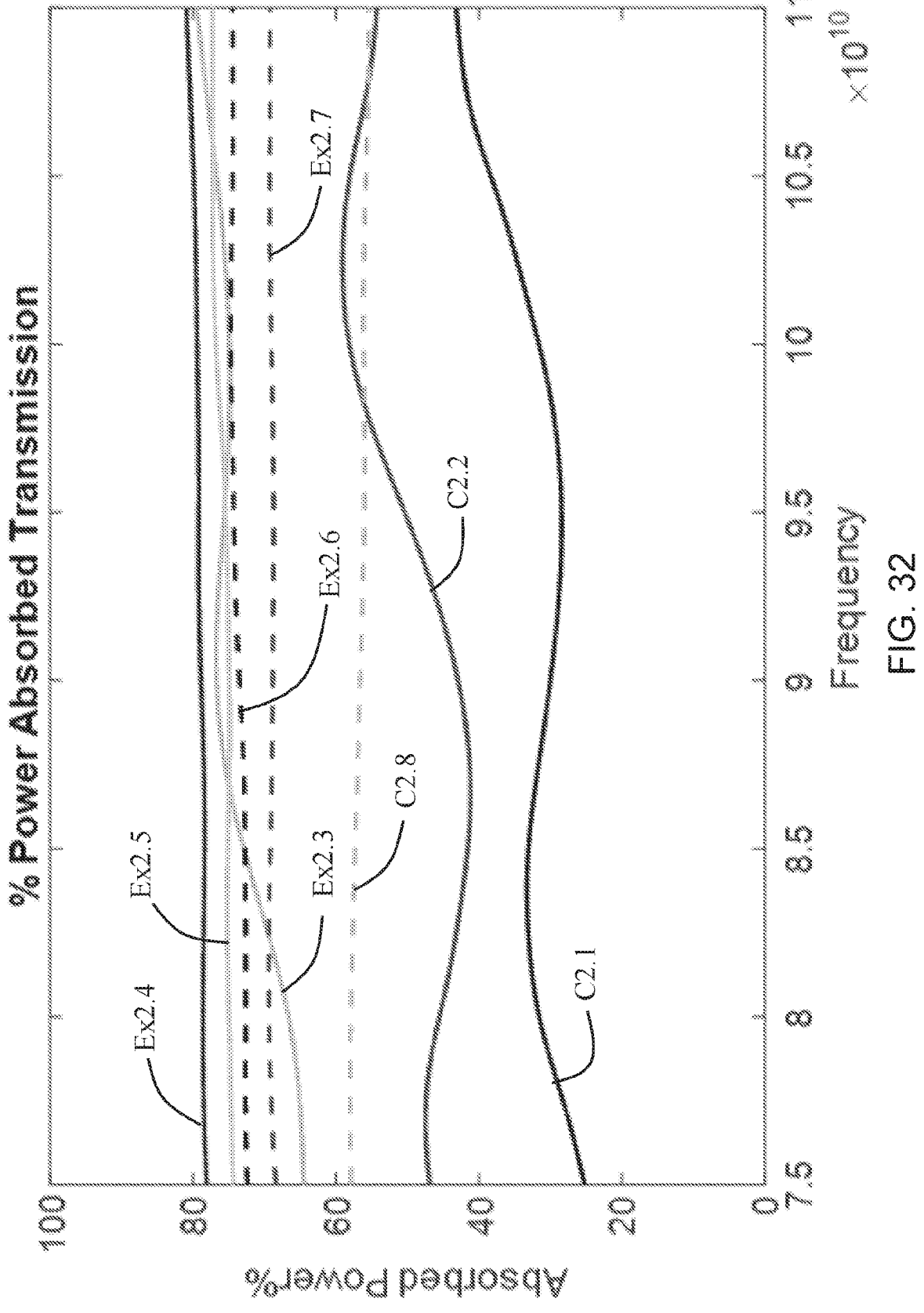
FIG. 32 is a graph illustrating percent absorbed power measured in transmission mode as a function of frequency in the W-band (75-110 GHz) for example and comparative compositions according to aspects of the disclosure.

Graphs of dielectric properties of the Table 2 compositions at frequencies in the W-band (75-110 GHz) are shown in FIGS. 29-32. FIG. 29 showed that the real part of the complex dielectric permittivity increased for all frequencies investigated (75-110 GHz) when the concentration of carbon nanotubes in the composition increased from 0.05 wt % to 3 wt %. A similar behavior was observed for the imaginary part of the complex dielectric permittivity for all concentrations when measured in the W-band (FIG. 30). FIG. 31 showed that the attenuation constant (in dB/cm) became more negative (higher attenuation) when the concentration of carbon nanotubes in the composition increased from 0.05 wt % to 3 wt % for all frequencies of the W-band investigated. The percent Absorbed Power measured in Transmission mode increased with the concentration of carbon nanotubes up to a certain loading and then decreased, at least within a portion of the W-band frequency range investigated (FIG. 32).

The above description is intended to be illustrative, and not restrictive. For example, the above-described examples (or one or more aspects thereof) may be used in combination with each other. Other aspects can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description as examples or aspects, with each claim standing on its own as a separate aspect, and it is contemplated that such aspects can be combined with each other in various combinations or permutations. The scope of the disclosure should be determined with reference to the appended claims, along with the full scope of equivalents to which such claims are entitled.

What is claimed is:

1. A thermoplastic composition comprising:
   a thermoplastic polymer component comprising a polyester;
   a polycarbonate-siloxane copolymer, and
   from greater than 0.10 wt % to about 1.95 wt % of a carbon nanotube (CNT) filler,
   wherein the CNT filler has an average diameter of about 5-15 nanometers (nm), a surface area of at least 100 square meters per gram ($m^2$/g), and a volume resistivity less than $10^{-3}$ Ohm·centimeters (Ω·cm),
   wherein a 6 inch (in)×8 in×⅛ in molded sample of the composition has a percent Absorbed Power measured in Transmission mode of at least 60% when observed at a 77 GHz frequency according to a Free Space method, and
   wherein the composition has a notched Izod impact (NII) strength of at least 102 Joules per meter (J/m) at −30° C. as tested in accordance with ASTM D256 and ASTM D4812.

2. The thermoplastic composition according to claim 1, wherein the polyester comprises polybutylene terephthalate (PBT), polyethylene terephthalate (PET), poly(cyclohexylenedimethylene terephthalate) (PCT), polyethylene terephthalate glycol (PETG), polycyclohexylene dimethylene terephthalate glycol (PCTG), polycyclohexylene dimethylene terephthalate acid (PCTA), polyethylene naphthalate (PEN), polybutylene naphthalate (PBN), copolymers thereof, or a combination thereof.

3. The thermoplastic composition according to claim 1, wherein the composition comprises polybutylene terephthalate (PBT).

4. The thermoplastic composition according to claim 1, wherein the composition has a volume electrical resistivity of at least $1.0×10^{11}$ Ω·cm.

5. The thermoplastic composition according to claim 1, wherein a 6 in×8 in×⅛ in molded sample of the composition has a percent Absorbed Power measured in Transmission mode of at least 60% when observed at frequencies of from 75 GHz to 110 GHz according to a Free Space method.

6. The thermoplastic composition according to claim 1, wherein the composition comprises from greater than 0.25 wt % to less than 1 wt % of the CNT filler, wherein a 6 in×8 in×⅛ in molded sample of the composition has a Percent Absorbed Power measured in Transmission mode of at least 74% when observed at a 77 GHz frequency according to a Free Space method.

7. The thermoplastic composition according to claim 1, wherein the composition comprises from greater than 0.25 wt % to about 1.95 wt % of the CNT filler, and wherein a molded sample of the composition has an attenuation constant of at least −30 dB/cm when observed at a 77 GHz frequency according to a free space method.

8. The thermoplastic composition according to claim 1, wherein the composition further comprises at least one additional additive, wherein the at least one additional additive comprises an acid scavenger, an anti-drip agent, an antioxidant, an antistatic agent, a colorant, a de-molding agent, a flow promoter, a lubricant, a mold release agent, a plasticizer, a quenching agent, a flame retardant, a UV reflecting additive, an impact modifier, a blowing agent, a reinforcing agent, or a combination thereof.

9. An article comprising the thermoplastic composition according to claim 1.

10. The article according to claim 9, wherein the article is a microwave absorber for an internal or external radar sensor.

11. The article according to claim 9, wherein the article is a microwave absorber for a radar sensor, camera, or an electronic control unit.

12. The article according to claim 9, wherein the article comprises a transmitting antenna, a receiving antenna, and at least two openings to allow transmission of microwave radiation between the transmitting antenna and the receiving antenna.

13. A method for forming a thermoplastic composition, comprising:

combining a thermoplastic polymer component comprising a polyester and a polycarbonate-siloxane copolymer with from greater than 0.10 wt % to about 1.95 wt % of a carbon nanotube (CNT) filler to form a mixture; and molding the mixture to form the thermoplastic composition, wherein the CNT filler has an average diameter of about 5-15 nanometers (nm), a surface area of at least 100 square meters per gram (m$^2$/g), and a volume resistivity less than 10$^{-3}$ Ohm·centimeters ($\Omega$·cm), wherein a 6 in×8 in×⅛ in molded sample of the thermoplastic composition has a percent Absorbed Power measured in Transmission mode of at least 60% when observed at a 77 GHz frequency according to a Free Space method, and wherein the composition has a notched Izod impact (NII) strength of at least 102 Joules per meter (J/m) at −30° C. as tested in accordance with ASTM D256 and ASTM D4812.

14. The thermoplastic composition according to claim 1, wherein the composition comprises from about 0.25 wt % to less than 1 wt % of the CNT filler.

15. The method according to claim 13, wherein the composition comprises from about 0.25 wt % to less than 1 wt % of the CNT filler.

* * * * *